(12) United States Patent
Liu et al.

(10) Patent No.: US 12,338,085 B2
(45) Date of Patent: Jun. 24, 2025

(54) SAND STORAGE AND CONVEYING APPARATUS

(71) Applicant: YANTAI JEREH PETROLEUM EQUIPMENT & TECHNOLOGIES CO., LTD., Shandong (CN)

(72) Inventors: Zhongliang Liu, Shandong (CN); Kaishen Liu, Shandong (CN); Chuanlu Bao, Shandong (CN); Liang Lv, Shandong (CN); Rikui Zhang, Shandong (CN); Xincheng Li, Shandong (CN); Yipeng Wu, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 738 days.

(21) Appl. No.: 17/558,305

(22) Filed: Dec. 21, 2021

(65) Prior Publication Data

US 2023/0040970 A1 Feb. 9, 2023

(30) Foreign Application Priority Data

Aug. 9, 2021 (CN) .......................... 202110907997.9

(51) Int. Cl.
*B65G 63/00* (2006.01)
*B65G 15/30* (2006.01)
(Continued)

(52) U.S. Cl.
CPC .......... *B65G 63/065* (2013.01); *B65G 15/30* (2013.01); *B65G 43/08* (2013.01); *B65G 43/10* (2013.01); *B65G 2201/045* (2013.01)

(58) Field of Classification Search
CPC ...... B65G 63/065; B65G 15/30; B65G 43/10; B65G 2201/045
See application file for complete search history.

(56) References Cited

U.S. PATENT DOCUMENTS

| 3,339,897 A | 9/1967 | Davis, Jr. |
| 4,453,829 A | 6/1984 | Althouse, III |
(Continued)

FOREIGN PATENT DOCUMENTS

| CN | 2170241 Y | 6/1994 |
| CN | 2653117 Y | 11/2004 |
(Continued)

OTHER PUBLICATIONS

Machine Translation of WO2021012831 to Tian cited in IDS mailed Aug. 14, 2024 (Year: 2021).*
(Continued)

*Primary Examiner* — Anshu Bhatia
(74) *Attorney, Agent, or Firm* — Crowell & Moring LLP

(57) ABSTRACT

A sand storage and conveying apparatus is provided. The sand storage and conveying apparatus includes: a sand storage device, at least two first conveying devices and a lifting device. The sand storage device includes at least two sand storage tanks arranged along a first direction; the at least two first conveying devices are arranged along the first direction and configured to convey sand to the at least two sand storage tanks, respectively; the lifting device includes a supporting frame and at least two lifting members connected onto the supporting frame, the at least two lifting members are arranged along the first direction, and each of the at least two lifting members is configured to lift a container with sand and put the container with sand into at least one of the first conveying devices.

17 Claims, 15 Drawing Sheets

(51) Int. Cl.
*B65G 43/08* (2006.01)
*B65G 43/10* (2006.01)
*B65G 63/06* (2006.01)

(56) References Cited

U.S. PATENT DOCUMENTS

| | | | |
|---|---|---|---|
| 4,460,276 | A | 7/1984 | Arribau |
| 6,193,402 | B1 | 2/2001 | Grimland |
| 9,022,120 | B2 | 5/2015 | Zamora et al. |
| 9,328,599 | B2 | 5/2016 | Pich et al. |
| 9,375,691 | B2 | 6/2016 | Stegemoeller et al. |
| 9,833,756 | B2 | 12/2017 | Stoppler |
| 2014/0069650 | A1 | 3/2014 | Stegemoeller |
| 2015/0284194 | A1 | 10/2015 | Oren et al. |
| 2016/0047184 | A1 | 2/2016 | Luharuka |
| 2016/0216171 | A1 | 7/2016 | Moakler |
| 2016/0320347 | A1 | 11/2016 | Moakler |
| 2020/0149556 | A1 | 5/2020 | Judge |

FOREIGN PATENT DOCUMENTS

| | | |
|---|---|---|
| CN | 202322712 U | 7/2012 |
| CN | 102806027 A | 12/2012 |
| CN | 103193160 A | 7/2013 |
| CN | 203066935 U | 7/2013 |
| CN | 103381339 A | 11/2013 |
| CN | 103640981 A | 3/2014 |
| CN | 103958039 A | 7/2014 |
| CN | 203899476 U | 10/2014 |
| CN | 104147953 A | 11/2014 |
| CN | 104741012 A | 7/2015 |
| CN | 204447897 U | 7/2015 |
| CN | 105251403 A | 1/2016 |
| CN | 105854559 A | 8/2016 |
| CN | 205850752 U | 1/2017 |
| CN | 206045899 U | 3/2017 |
| CN | 103628852 B | 5/2017 |
| CN | 106774107 A | 5/2017 |
| CN | 107159046 A | 9/2017 |
| CN | 206661107 U | 11/2017 |
| CN | 206735275 U | 12/2017 |
| CN | 206935166 U | 1/2018 |
| CN | 107774144 A | 3/2018 |
| CN | 107902427 A | 4/2018 |
| CN | 207169595 U | 4/2018 |
| CN | 207497930 U | 6/2018 |
| CN | 207652980 A | 7/2018 |
| CN | 108371894 A | 8/2018 |
| CN | 208086829 U | 11/2018 |
| CN | 107381380 B | 12/2018 |
| CN | 208260574 U | 12/2018 |
| CN | 208500947 U | 2/2019 |
| CN | 109399459 A | 3/2019 |
| CN | 109879079 A | 6/2019 |
| CN | 208934678 U | 6/2019 |
| CN | 110077965 A | 8/2019 |
| CN | 209476032 U | 10/2019 |
| CN | 110482250 A | 11/2019 |
| CN | 110989603 A | 4/2020 |
| CN | 111005710 A | 4/2020 |
| CN | 210655305 U | 6/2020 |
| CN | 111361955 A | 7/2020 |
| CN | 211190074 U | 8/2020 |
| CN | 211225549 U | 8/2020 |
| CN | 211384571 U | 9/2020 |
| CN | 211448645 U | 9/2020 |
| CN | 211636063 U | 10/2020 |
| CN | 110371856 B | 11/2020 |
| CN | 112279107 A | 1/2021 |
| CN | 112373864 A | 2/2021 |
| CN | 112389950 A | 2/2021 |
| CN | 113385091 A | 9/2021 |
| CN | 113428616 A | 9/2021 |
| DE | 102015218686 A1 | 3/2017 |
| JP | 2005 205407 A | 8/2005 |
| KR | 20140080709 A | 7/2014 |
| WO | WO 2021/012831 A1 | 1/2021 |

OTHER PUBLICATIONS

Liao et al.; "Progress of researches and applications for high shear mixers"; Chemical Industry and Engineering Progress, 38(3); 2019; pp. 1160-1175.

Tai, Guang-feng et al.; "Study on an Intelligent Control System of the Sand Conveyance Device for Factory Fracturing"; China Academic Journal Electronic Publishing House Mining & Metallurgy, vol. 24, No. 5; Oct. 2015; pp. 67-61.

US Office Action, Aug. 29, 2024, pp. 1-8, issued in U.S. Appl. No. 18/515,541, USPTO, Alexandria, Virginia.

* cited by examiner

SAND STORAGE AND CONVEYING APPARATUS

CROSS-REFERENCE OF RELATED APPLICATIONS

This patent application claims priority of Chinese patent application No. 202110907997.9 filed on Aug. 9, 2021, and the contents disclosed in the above Chinese patent application are incorporated herein by reference as a part of the present application

TECHNICAL FIELD

Embodiments of the present disclosure relate to a sand storage and conveying apparatus.

BACKGROUND

During fracturing operations in oil and gas fields, it is necessary to use fracturing proppants to support fractures produced by fracturing. After the fracturing treatment on a mineral deposit, an oil and gas-bearing stratum is cracked, and oil and gas are gathered and flow out from passages formed by the fractures. The fracturing proppants enter the stratum along with high-pressure liquid to fill the fractures of the stratum, which may serve for supporting the fractures so that the fractures will not be closed due to stress release, thereby maintaining high diversion capacity and smooth circulation of oil and gas, and increasing the yield.

Transportation and storage of the fracturing proppants are important links in the operations of oil and gas fields. In order to ensure the continuity of sand supply during the fracturing, a sand storage and conveying apparatus is required. The sand storage and conveying apparatus may store the proppants and convey the stored proppants to the outside.

SUMMARY

At least one embodiment of the present disclosure provides a sand storage and conveying apparatus, including: a sand storage device, including at least two sand storage tanks arranged along a first direction; at least two first conveying devices, wherein the at least two first conveying devices are arranged along the first direction and configured to convey sand to the at least two sand storage tanks, respectively; and a lifting device, including a supporting frame and at least two lifting members connected onto the supporting frame, wherein the at least two lifting members are arranged along the first direction, and each of the at least two lifting members is configured to lift a container with sand and put the container with sand into at least one of the first conveying devices.

For example, in the sand storage and conveying apparatus provided by at least one embodiment of the present disclosure, each of the at least two lifting members includes: a movable frame, connected to the supporting frame and configured to move along the first direction relative to the supporting frame; and a fetching member connected to the movable frame and configured to move along a second direction and a third direction relative to the movable frame, wherein the fetching member is further configured to be detachably connected with the container with sand, the second direction is an arrangement direction of the sand storage device and the lifting device, and the third direction intersects with a plane where the first direction and the second direction are located, wherein at least two movable frames of the at least two lifting members are arranged along the first direction.

For example, in the sand storage and conveying apparatus provided by at least one embodiment of the present disclosure, the supporting frame includes a guide rail frame extending along the first direction, and the guide rail frame is provided with a sliding guide rail connected with the at least two movable frames; and the at least two movable frames are configured to move between a first end and a second end of the sliding guide rail, respectively.

For example, in the sand storage and conveying apparatus provided by at least one embodiment of the present disclosure, each of the at least two sand storage tanks includes a top surface, the top surface includes a planar area and a bevel area, the planar area is provided with a material inlet, and the bevel area is inclined from an edge of the planar area towards a bottom of the sand storage device; and two sides of the planar area in the second direction are provided with the bevel area, respectively, and the second direction is perpendicular to the first direction.

For example, in the sand storage and conveying apparatus provided by at least one embodiment of the present disclosure, each of the at least two sand storage tanks includes at least two sand storage bins, the at least two sand storage bins are arranged along the first direction, and a top surface of each of the at least two sand storage bins is provided with one material inlet; and each of the at least two sand storage tanks further includes at least one distributing valve, each of the at least one distributing valve is arranged between two material inlets, each of the at least one distributing valve is configured to receive sand from one of the at least two first conveying devices and convey the sand to one material inlet connected with the distributing valve.

For example, in the sand storage and conveying apparatus provided by at least one embodiment of the present disclosure, the distributing valve includes a shell and a baffle plate arranged inside the shell, the shell forms an inlet, a first outlet and a second outlet, a first passage is formed between the inlet and the first outlet, a second passage is formed between the inlet and the second outlet, and the baffle plate is configured to close one of the first passage and the second passage and open the other one of the first passage and the second passage; a vertical distance from a top surface of the shell where the inlet of the shell is located to the bottom of the sand storage device is greater than a vertical distance from the top surface of the sand storage tank to the bottom of the sand storage device; and a side surface of the shell connecting the inlet and the first outlet is a bevel surface, and a side surface of the shell connecting the inlet and the second outlet is a bevel surface.

For example, in the sand storage and conveying apparatus provided by at least one embodiment of the present disclosure, the supporting frame includes an installing frame and a hanging frame connected to the installing frame, and the hanging frame is connected with the guide rail frame; and a vertical distance from one end of the hanging frame away from the installing frame to a bottom of the supporting frame is greater than a vertical distance from one end of the hanging frame close to the installing frame to the bottom of the supporting frame.

For example, the sand storage and conveying apparatus provided by at least one embodiment of the present disclosure further includes: a second conveying device, located at one side of the at least two sand storage tanks close to a bottom of the sand storage device, and configured to receive and convey the sand outputted by the at least two sand storage tanks; and a third conveying device, connected with the second conveying device, and configured to receive the sand conveyed by the second conveying device and convey the sand to an target apparatus.

For example, the sand storage and conveying apparatus provided by at least one embodiment of the present disclosure further includes: a rotation driving device, connected with the third conveying device, and configured to drive the third conveying device to rotate relative to the second conveying device.

For example, in the sand storage and conveying apparatus provided by at least one embodiment of the present disclosure, the sand storage device further includes: a sluice valve, arranged at a material outlet of the sand storage device; and a sluice valve driving device, configured to adjust an opening degree of the sluice valve so as to adjust a discharging speed of the sand storage device.

For example, in the sand storage and conveying apparatus provided by at least one embodiment of the present disclosure, each of the at least two sand storage tanks includes a fixed tank body and an extension bin; and the sand storage and conveying apparatus further includes at least two extension bin driving devices, the at least two extension bin driving devices are configured to drive the extension bins of the at least two sand storage tanks to rise and fall, respectively, so as to adjust a capacity of the at least two sand storage tanks, respectively.

For example, the sand storage and conveying apparatus provided by at least one embodiment of the present disclosure further includes: a processing device, wherein each of the at least two extension bin driving devices includes an extension bin lifting member, wherein the extension bin lifting member drives the extension bin to rise and fall, and each of the at least two extension cabin driving devices is further configured to send a lifting height of the extension bin lifting member to the processing device; and the processing device is configured to adjust extension bin lifting members of the at least two extension bin driving devices according to lifting heights of the lifting bin lifting members of the at least two extension bin driving devices.

For example, in the sand storage and conveying apparatus provided by at least one embodiment of the present disclosure, the processing device is configured to: adjust the lifting height of the extension bin lifting member of at least one extension bin driving device in the case where a difference between the lifting height of the extension bin lifting member of any one of the at least two extension bin driving devices and an average value of lifting heights of the extension bin lifting members of other extension bin driving devices is greater than a predetermined threshold value, so that the difference between the lifting height of the extension bin lifting member of the any one of the at least two extension bin driving devices and the average value of the lifting heights of the extension bin lifting members of the other extension bin driving devices is less than or equal to the predetermined threshold value.

For example, in the sand storage and conveying apparatus provided by at least one embodiment of the present disclosure, the second conveying device includes a first conveyor belt, a first conveyor belt driving motor for driving the first conveyor belt to run and a first state detecting member for detecting a running state of the first conveyor belt; the third conveying device includes a second conveyor belt, a second conveyor belt driving motor for driving the second conveyor belt to run and a second state detecting member for detecting a running state of the second conveyor belt; the sand storage and conveying apparatus further includes a processing device, and the second state detecting member is further configured to send information about the running state of the second conveyor belt to the processing device; and the processing device is further configured to control the first conveyor belt driving motor to stop running in the case where the information about the running state of the second conveyor belt indicates that the second conveyor belt stops running.

For example, in the sand storage and conveying apparatus provided by at least one embodiment of the present disclosure, the first state detecting member is further configured to send information about the running state of the first conveyor belt to the processing device; and the processing device is further configured to control the sluice valve driving device to close the sluice valve in the case where the information about the running state of the first conveyor belt indicates that the first conveyor belt stops running.

For example, the sand storage and conveying apparatus provided by at least one embodiment of the present disclosure further includes: an opening degree detecting device, configured to detect an actual opening degree of the sluice valve and send the actual opening degree to the processing device; a running speed detecting device, configured to detect an actual running speed of the first conveyor belt and send the actual running speed to the processing device; and a weight detecting device, configured to detect an actual sand feeding quantity of the sand storage device and send the actual sand feeding quantity to the processing device.

For example, in the sand storage and conveying apparatus provided by at least one embodiment of the present disclosure, the processing device is further configured to: send a first control signal to the sluice valve driving device according to a target sand feeding quantity and type information of the sand in the sand storage device so as to control the opening degree of the sluice valve; determine a theoretical sand feeding quantity according to the actual opening degree of the sluice valve and the type information of the sand; control the running speed of the first conveyor belt according to the theoretical sand feeding quantity; and send a second control signal to the rotation driving device according to the actual running speed of the first conveyor belt and the theoretical sand feeding quantity so as to control an inclined angle of the third conveying device relative to the second conveying device.

For example, in the sand storage and conveying apparatus provided by at least one embodiment of the present disclosure, the processing device is further configured to: control the running speed of the first conveyor belt in real time according to the actual sand feeding quantity and the actual running speed of the first conveyor belt.

BRIEF DESCRIPTION OF THE DRAWINGS

In order to describe embodiments of the present disclosure more clearly, the drawings of the embodiments will be briefly introduced below. Obviously, the drawings in the following description only relate to some embodiments of the present disclosure without constituting any limitation to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In embodiments of the present disclosure, the fracturing proppant may be referred to as sand, and the terms "sand material" and "sand" in the following description may both refer to the "fracturing proppant".

Figure 1:
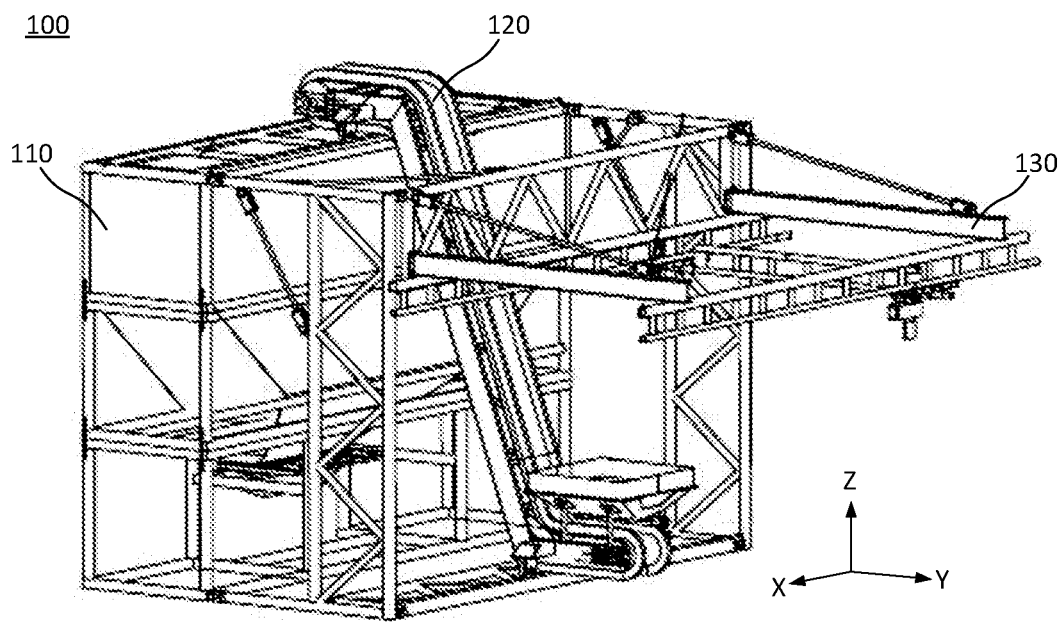
FIG. 1 illustrates a structural schematic diagram of a sand storage and conveying apparatus.

FIG. 1 illustrates a structural schematic diagram of a sand storage and conveying apparatus. As shown in FIG. 1, the sand storage and conveying apparatus may include a sand storage tank 110, a belt conveyor 120, a lifter 130, an electrical system, an electronic control system (not shown in the drawings) and the like.

The lifter 130 lifts sand bags into a hopper of the belt conveyor 120. After the sand bag is broken in the hopper of the belt conveyor 120, sand materials fall onto a belt of the belt conveyor 120 and are conveyed into the sand storage tank 110 through the belt, so that the sand materials are stored in the sand storage tank 110. In some embodiments, the sand storage tank 110 may be provided with two sand storage bins arranged along a first direction (such as an X-axis direction). Each sand storage bin is provided with a material inlet and a material outlet. The belt conveyor 120 may be configured to move along the first direction, so that one belt conveyor 120 is used to convey the sand materials to the two sand storage bins. The lifter 130 may have functions such as automatic lifting, one-click positioning, one-click returning and the like, and has high efficiency in sand lifting and feeding. The electronic control system is a control system of the sand storage and conveying apparatus.

The sand storage and conveying apparatus shown in FIG. 1 changes a traditional high-altitude sand feeding mode of the lifter. The apparatus integrates sand storage, sand conveying and sand lifting, avoids dangerous aerial works, and eliminates the need of using an expensive lifter to feed the sand materials, and also creates economic benefit for the well site operation. However, at present, with the demands on a large amount of sand materials in fracturing operation, the sand storage and conveying apparatus that adopts the mode of single lifter and single belt has small conveying capacity and low storage speed, and the conveying efficiency cannot meet the operation requirements of large amount of sand materials.

At least one embodiment of the present disclosure provides a sand storage and conveying apparatus. The sand storage and conveying apparatus includes a sand storage device, at least two first conveying devices and a lifting device. The sand storage device includes at least two sand storage tanks arranged along a first direction; the at least two first conveying devices are arranged along the first direction and configured to convey sand respectively to the at least two sand storage tanks; and the lifting device includes a supporting frame and at least two lifting members connected onto the supporting frame, the at least two lifting members are arranged along the first direction, and each of the at least two lifting members is configured to lift a container with sand and to put the container with sand into at least one first conveying device. The sand storage and conveying apparatus adopts two or more lifting members and two or more first conveying devices to convey the sand to the sand storage device, so that the conveying efficiency can be multiplied, the storage speed is increased, and the operation requirement of a large amount of sand materials can be satisfied.

Figure 2:
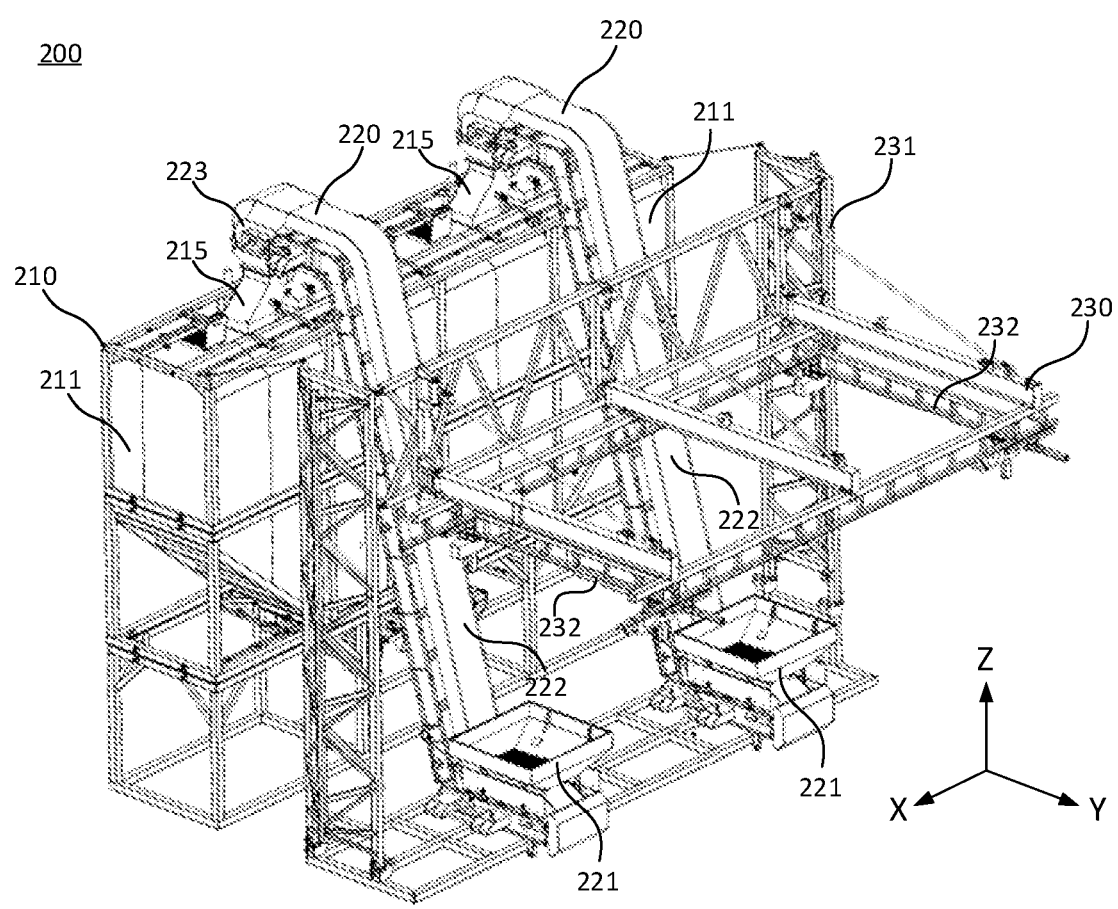
FIG. 2 illustrates a structural schematic diagram of a sand storage and conveying apparatus according to at least one embodiment of the present disclosure.

FIG. 2 illustrates a structural schematic diagram of a sand storage and conveying apparatus provided by at least one embodiment of the present disclosure.

As shown in FIG. 2, the sand storage and conveying apparatus 200 includes a sand storage device 210, at least two first conveying devices 220 and a lifting device 230. The sand storage device 210 includes at least two sand storage tanks 211 arranged along the first direction. The at least two first conveying devices 220 are arranged along the first direction and configured to convey the sand respectively to the at least two sand storage tanks 211. The lifting device 230 includes a supporting frame 231 and at least two lifting members 232 connected onto the supporting frame. The at least two lifting members 232 are arranged along the first direction, and each of the at least two lifting members 232 is configured to lift a container with sand and put the container with sand into at least one first conveying device 220.

For example, the first direction may be an X-axis direction shown in FIG. 2.

For example, in the following embodiments and accompanying drawings, the description is made with reference to the case where the sand storage device 210 includes two sand storage tanks 211, the sand storage and conveying apparatus includes two first conveying device 220, and the lifting device 230 includes two lifting members 232, by way of example. However, the embodiments of the present disclosure are not limited to this. In some embodiments, the sand storage device 210 may include three or more sand storage tanks 211. The sand storage and conveying apparatus includes three or more first conveying devices 220. The lifting device 230 includes three or more lifting members 232. The number of the sand storage tanks 211, the first conveying devices 220 and the lifting members 232 may be the same.

For example, one sand storage tank 211 may correspond to one first conveying device 220 and one lifting member 232, which may form a sand storage line. That is, in the case where N sand storage tanks 211, N first conveying devices 220 and N lifting members 232 are provided, N sand storage lines may be formed, wherein N is an integer greater than or equal to 2.

For example, for the lifting device 230, N (two or more) lifting members 232 may be connected onto one supporting frame 231. N lifting members 232 may be operated independently. Each lifting member 232 may lift the container with sand from the ground or a transportation machinery (such as a carrier vehicle), and the container with sand may be a bag with sand, which may be referred to as bagged sand below. After the lifting member 232 lifts the bagged sand, the bagged sand may be driven to move to a position above an inlet of the corresponding first conveying device 220 and be put into the inlet of the corresponding first conveying device 220.

For example, the first conveying device 220 may be a conveyor, and includes a hopper portion 221, a loading portion 222 and a feeding portion 223. The hopper portion 221 may serve as an inlet of the conveyor, and the loading portion 222 includes a conveyor belt. The lifting member 232 may put the bagged sand into the hopper portion 221, and the hopper portion 221 may perform a bag breaking treatment on the bagged sand. After the bag is broken, the sand in the bag may fall onto the conveyor belt of the loading portion 222, and the conveyor belt conveys the sand upwards to a material inlet of the corresponding sand storage tank 211, so that the sand enters the sand storage tank 211 via the material inlet, thereby realizing the conveying and storage of the sand. Compared with the method adopting only one first conveying device in relevant technologies, the embodiment of the present disclosure adopts two or more first conveying devices, so that the load of each first conveying device may be reduced, then the service life of vulnerable parts may be prolonged, and the overall stability of the apparatus may be improved.

For example, in an example, N (two or more) lifting members 232 may deliver the bagged sand respectively to N first conveying devices 220. As shown in FIG. 2, the lifting member 232 at the left side is configured to deliver the bagged sand to the first conveying device 220 at the left side, and the lifting member 232 located at the right side is configured to deliver the bagged sand to the first conveying device 220 at the right side.

For example, in another example, each lifting member 232 may deliver the bagged sand to N first conveying devices 220. As shown in FIG. 2, the lifting member 232 located at the left side may deliver the bagged sand to the first conveying device 220 at the left side, and may also move to be above the first conveying device 220 at the right side to deliver the bagged sand to the first conveying device 220 at the right side. The lifting member 232 located at the right side may deliver the bagged sand to the first conveying device 220 at the right side, and may also move to be above the first conveying device 220 at the left side to deliver the bagged sand to the first conveying device 220 at the left side. On the basis of such technical solution, the two lifting members 232 may be used as backup for each other. When a failure happens on one lifting member 232, the other lifting members 232 may be used to replace the failed lifting member 232 to complete the corresponding lifting work.

The sand storage and conveying apparatus according to the embodiment of the present disclosure adopts two or more lifting members and two or more first conveying devices to convey the sand to the sand storage device, so that the conveying efficiency may be multiplied, the storage speed may be increased, and the operation requirement of a large amount of sand materials can be satisfied.

Figure 3:
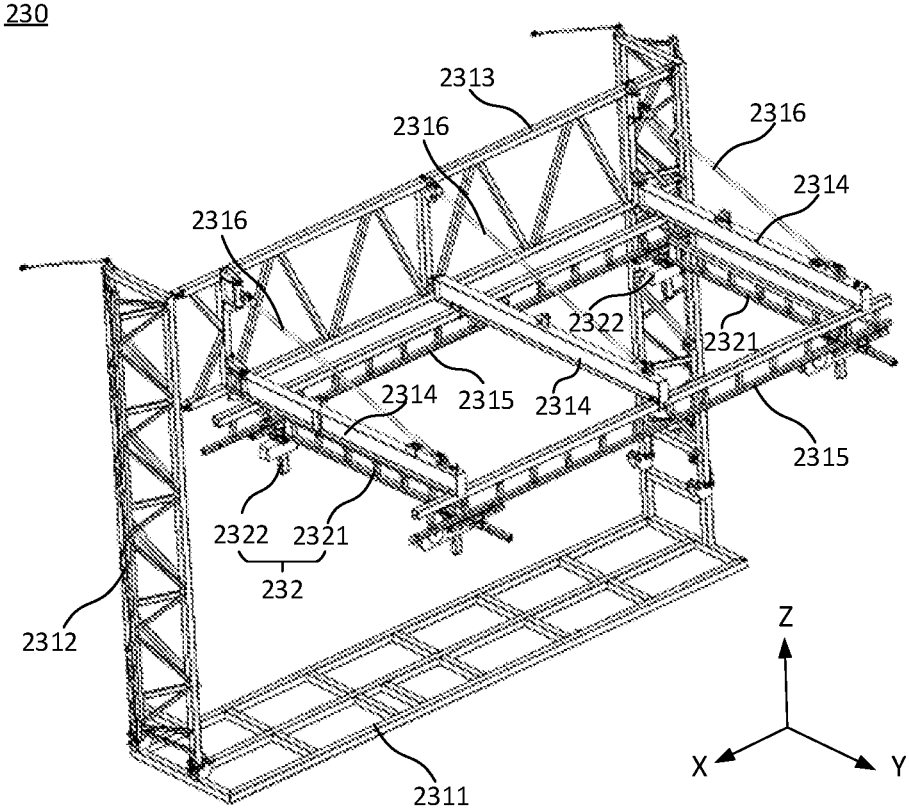
FIG. 3 illustrates a structural schematic diagram of a lifting device in a sand storage and conveying apparatus provided by at least one embodiment of the present disclosure.

FIG. 3 illustrates a structural schematic diagram of a lifting device provided by at least one embodiment of the present disclosure. As shown in FIG. 3, the lifting device 230 includes a supporting frame. The supporting frame may include a base 2311, vertical frames 2312, an installing frame 2313, a hanging frame 2314 and a guide rail frame 2315.

For example, the base 2311 may be located on a supporting surface such as the ground. A first end of the vertical frame 2312 is connected with the base 2311, and a second end of the vertical frame 2312 extends upwards from the base 2311 along a third direction (such as a Z-axis direction). The supporting frame may include two vertical frames 2312 connected to two sides (two sides along the X-axis direction) of the base 2311 respectively.

For example, the installing frame 2313 is connected to the second ends of the vertical frames 2312 (i.e. the end away from the base 2311) and located between the two vertical frames 2312. A first end of the hanging frame 2314 is connected to the installing frame 2313, and a second end of the hanging frame 2314 extends forwards from the installing frame 2313 along a second direction (such as a Y-axis direction). The supporting frame may also include hanging rods 2316. The hanging rods 2316 may be connected between the installing frame 2313 and the second end of the hanging frame 2314 (i.e. the end away from the installing frame 2313). The hanging rods 2316 may make the installing frame 2313 more stable. The supporting frame may include two edge hanging frames 2314 connected to two sides (two sides along the X-axis direction) of the installing frame 2313 respectively. In some embodiments, in addition to the two edge hanging frames 2314, one or more intermediate hanging frames 2314 may also be arranged between the two hanging frames 2314 to improve the stability.

For example, the supporting frame includes guide rail frames 2315 extending along the first direction, for example, it may include two guide rail frames 2315. One of the two guide rail frames may be connected with the first ends of a plurality of hanging frames 2314 (including two edge hanging frames 2314 and the intermediate hanging frames 2314), for example, the guide rail frame 2315 located at the rear side as shown in FIG. 2; and the other guide rail frame may be connected with the second ends of the plurality of hanging frames 2314, for example, the guide rail frame 2315 located at the front side as shown in FIG. 2. The two guide rail frames 2315 both extend along the first direction (such as the X-axis direction).

For example, each of the at least two lifting members includes a movable frame 2321 and a fetching member 2322. The movable frame 2321 is connected to the supporting frame and configured to move along the first direction (such as the X-axis direction) relative to the supporting frame. The fetching member 2322 is connected to the movable frame 2321 and configured to move along a second direction (such as the Y-axis direction) and a third direction (such as the Z-axis direction) relative to the movable frame 2321, and the fetching member 2322 is further configured to be detachably connected with the container with sand. The second direction is an arrangement direction of the sand storage device and the lifting device. The third direction intersects with a plane where the first direction and the second direction are located. For example, in the case where the sand storage and conveying apparatus stands on a horizontal supporting surface such as the ground, every two of the first direction, the second direction and the third direction are perpendicular to each other, and the third direction may be a vertical direction. At least two movable frames 2321 in the at least two lifting members are arranged along the first direction.

For example, the guide rail frame 2315 is provided with a sliding guide rail connected with the at least two movable frames 2321. For example, two ends of each movable frame 2321 are connected with the front and rear guide rail frames 2315. The front and rear guide rail frames 2315 each may be provided with a sliding guide rail extending along the first direction. In this case, two ends of each movable frame 2321 are connected to the front and rear sliding guide rails respectively and can move along the sliding guide rails, i.e., moving along the first direction.

For example, in an example, the at least two movable frames 2321 each is configured to move between a first end and a second end of the sliding guide rail. Based on this, all of the movable frames 2321 have the same sliding range, i.e., moving from one end of the sliding guide rail to the other end of the sliding guide rail. In this case, if a failure happens on one movable frame 2321, the other movable frames 2321 may be used to replace the failed movable frame 2321 to complete the corresponding work.

For example, in another example, the sliding guide rail may be divided into at least two sliding segments. The at least two movable frames 2321 are respectively configured to move in the at least two sliding segments. For example, as shown in FIG. 3, a middle point along the X-axis direction of the movable frame 2315 may be used as a segmenting point to divide the sliding guide rail into a left sliding segment and a right sliding segment. The movable frame 2321 located at the left side may move in the left sliding segment, and the movable frame 2321 located at the right side may move in the right sliding segment.

For example, in a normal work state, the at least two movable frames 2321 may move respectively in respective sliding segments. When a failure happens on one movable frame 2321, a movement range of another movable frame adjacent to the failed movable frame 2321 may be enlarged to the sliding segment of the failed movable frame 2321, so that the another movable frame replaces the failed movable frame 2321 to work.

For example, the lifting member may also include an electric hoist. The fetching member 2322 may be a fetching portion of the electric hoist, for example, a hook of the electric hoist. One movable frame 2321 may be connected with one or more electric hoists. Each electric hoist may move back and forth along the movable frame 2321 (i.e. moving along the Y-axis direction), and the electric hoist may use a connecting wire to allow the hook to move up and down (i.e., moving along the Z-axis direction). In the running process of the lifting member, the movable frame 2321 may be controlled firstly to move to a position above a stack position of the bagged sand, then the position of the electric hoist may be adjusted in the longitudinal direction to align the electric hoist with the bagged sand, then a rope is released to move the hook of the electric hoist downwards to grasp the bagged sand, and the electric hoist is controlled to withdraw the rope so that the hook lift the bagged sand. Afterwards, the position(s) of the movable frame 2321 and/or the electric hoist is/are changed to align the lifted, bagged sand with the hopper portion 221, then the rope is released to move the hook of the electric hoist downwards. When the hook reaches a position close to the hopper portion 221, the hook is controlled to be separated from the bagged sand, so that the bagged sand falls into the hopper portion 221.

For example, the alternate lifting of the two lifting members 232 may increase the lifting efficiency of the whole apparatus by 1.5 times.

Figure 4:
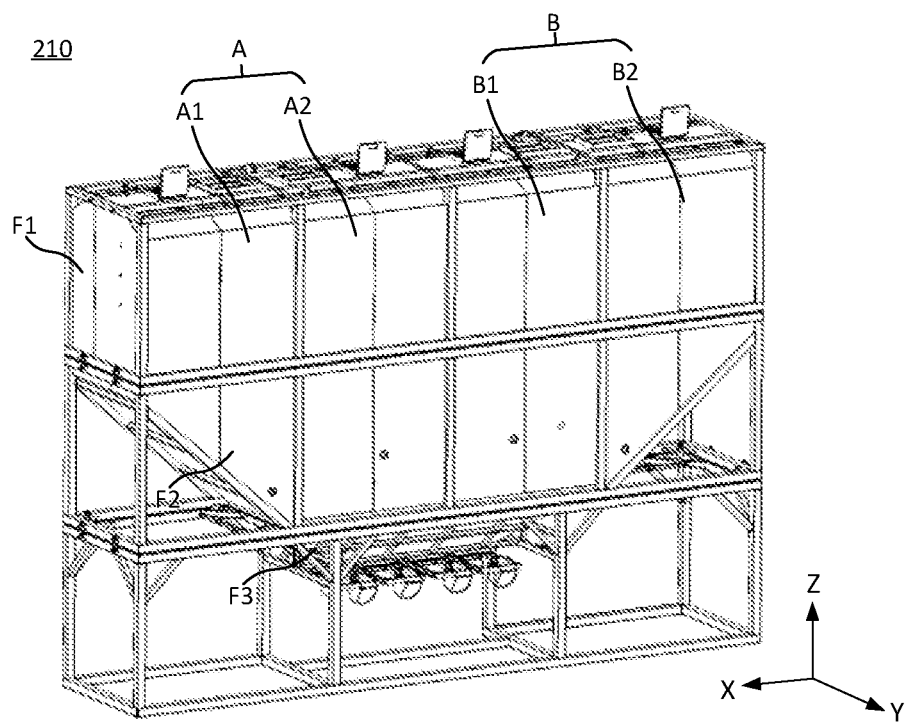
FIG. 4 illustrates a structural schematic diagram of a sand storage device in a sand storage and conveying apparatus provided by at least one embodiment of the present disclosure.
Figure 5:
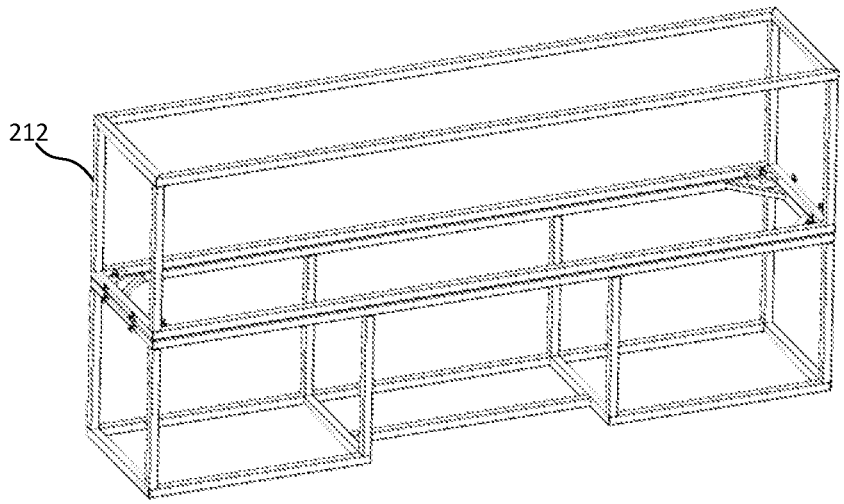
FIG. 5 illustrates a schematic diagram of a connecting structure of a sand storage device in a sand storage and conveying apparatus provided by at least one embodiment of the present disclosure.
Figure 6:
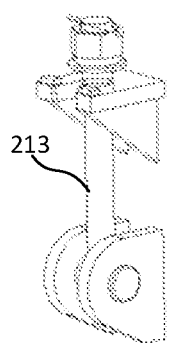
FIG. 6 illustrates a schematic diagram of a fastener of a sand storage device in a sand storage and conveying apparatus provided by at least one embodiment of the present disclosure.
Figure 7:
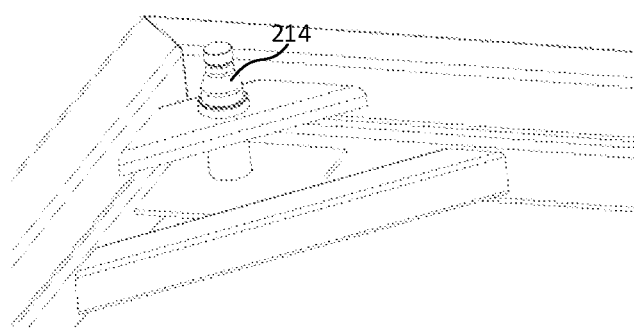
FIG. 7 illustrates a schematic diagram of a guiding column of a sand storage device in a sand storage and conveying apparatus provided by at least one embodiment of the present disclosure.

FIG. 4 illustrates a structural schematic diagram of a sand storage device provided by at least one embodiment of the present disclosure; FIG. 5 illustrates a schematic diagram of a connecting structure of a sand storage device provided by at least one embodiment of the present disclosure; FIG. 6 illustrates a schematic diagram of a fastener of a sand storage device provided by at least one embodiment of the present disclosure; and FIG. 7 illustrates a schematic diagram of a guiding column of a sand storage device provided by at least one embodiment of the present disclosure.

As shown in FIG. 4, the sand storage device 210 may include a plurality of layers of sand tanks arranged along a third direction (a Z-axis direction), for example, it may include three layers of sand tanks: a top layer of tanks F1, a middle layer of tanks F2 and a bottom layer of tanks F3. The three layers of tanks are communicated with one another, for example, the sand injected from the top layer of tanks may enter the middle layer of tanks, and may further enter the bottom layer of tanks from the middle layer of tanks. The adjacent layers of sand tanks may be connected by a connecting frame as shown in FIG. 5. Each layer of sand tanks may be installed and fixed with the aid of guiding columns 214 on four corners as shown in FIG. 7 and fasteners 213 (such as bolts) located on the side surface as shown in FIG. 6.

Figure 8:
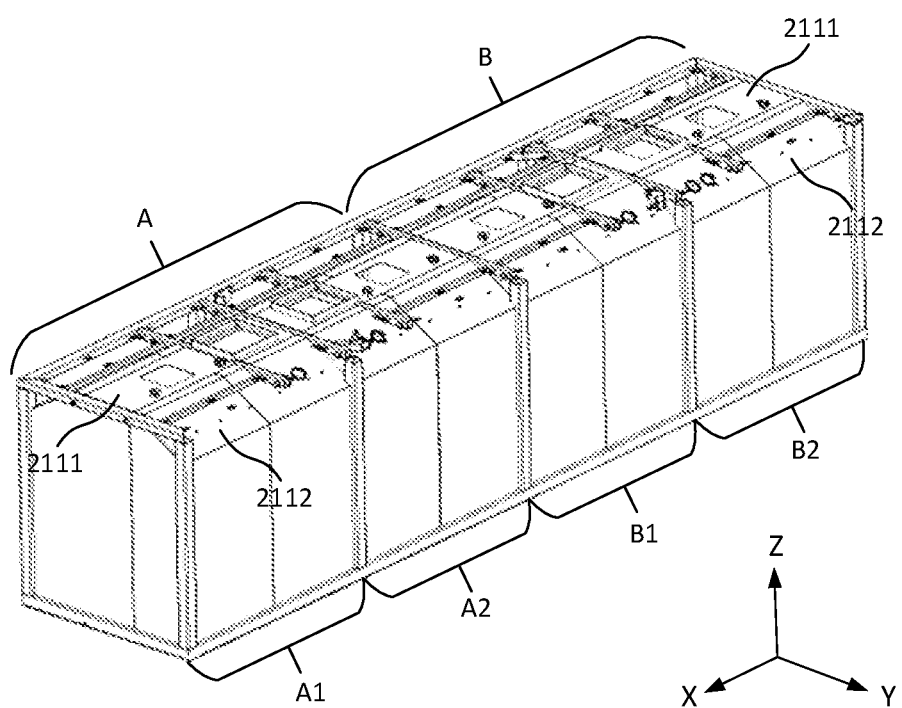
FIG. 8 illustrates a schematic diagram of a top surface of a sand storage device in the sand storage and conveying apparatus provided by at least one embodiment of the present disclosure.

FIG. 8 illustrates a schematic diagram of a top surface of a sand storage device provided by at least one embodiment of the present disclosure. As shown in FIG. 8, for example, each sand storage tank of the at least two sand storage tanks includes a top surface, and the top surface includes: a planar area 2111 provided with a material inlet, and a bevel area 2112 inclining from an edge of the planar area to the bottom of the sand storage device. Two sides of the planar area 2111 in the second direction are provided with the bevel area 2112 respectively, and the second direction is perpendicular to the first direction.

For example, the planar area 2111 may be parallel to an XY plane. Two sides of the planar area 2111 along the second direction (the Y-axis direction) may be provided with two bevel areas 2112. The two bevel areas 2112 extend respectively towards two sides of the planar area 2111 and are inclined downwards. Based on this, compared with a large-plane top surface with two sides closed in relevant technologies, the bevel areas of the top surface in the embodiment of the present disclosure may enable accumulated sand and accumulated water to flow to the ground along the bevels, so that the accumulated sand and accumulated water on the top of the top layer of tanks may be reduced effectively, thereby improving the operation condition at the top of the top layer of tanks, avoiding the problem in the prior art that the stability of the apparatus is affected by the frequent damage of the electric cylinder because the accumulated sand and accumulated water would bury an electric cylinder of a cover plate at the material inlet.

Figure 9:
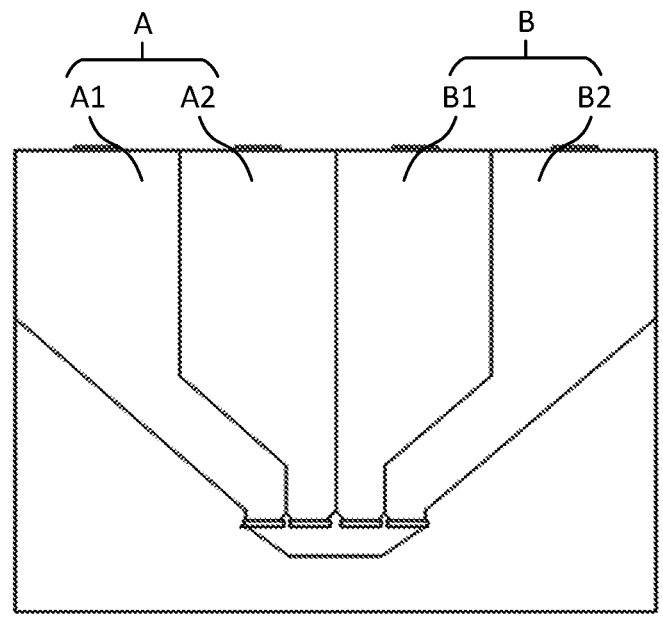
FIG. 9 illustrates a sectional view of a sand storage device in a sand storage and conveying apparatus provided by at least one embodiment of the present disclosure.

FIG. 9 illustrates a sectional view of a sand storage device provided by at least one embodiment of the present disclosure. As shown in FIG. 4, FIG. 8 and FIG. 9, each sand storage tank may include at least two sand storage bins, the at least two sand storage bins are arranged along the first direction, and the top surface of each sand storage bin is provided with one material inlet. For example, the sand storage device includes a sand storage tank A and a sand storage tank B. The sand storage tank A includes a sand storage bin A1 and a sand storage bin A2. The sand storage tank B includes a sand storage bin B1 and a sand storage bin B2. The sand storage bins A1, A2, B1 and B2 are arranged in sequence along the first direction (the X-axis direction). The sand storage bins A1, A2, B1 and B2 each are provided with a material inlet and a material outlet. In combination with FIG. 2 and FIG. 5, each sand storage tank also includes at least one distributing valve 215. Each distributing valve 215 is arranged between the two material inlets. Each distributing valve 215 is configured to receive the sand from one first conveying device 220 and convey the sand to one material inlet connected with the distributing valve 215. For example, the material inlet of the sand storage bin A1 and the material inlet of the sand storage bin A2 are provided with the same distributing valve. Under the action of the distributing valve, the sand conveyed by the first conveying device 220 at the left side may enter the sand storage bin A1 or the sand storage bin A2. The material inlet of the sand storage bin B1 and the material inlet of the sand storage bin B2 are provided with the same distributing valve. Under the action of the distributing valve, the sand conveyed by the first conveying device 220 at the right side may enter the sand storage bin B1 or the sand storage bin B2.

Figure 10:
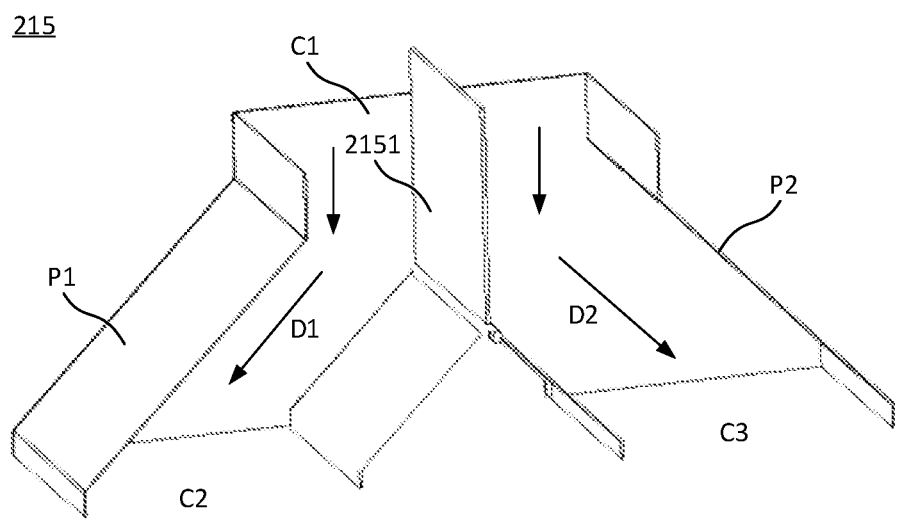
FIG. 10 illustrates a sectional view of a distributing valve in a sand storage and conveying apparatus provided by at least one embodiment of the present disclosure.

FIG. 10 illustrates a sectional view of a distributing valve provided by at least one embodiment of the present disclosure. As shown in FIG. 10, for example, the distributing valve 215 includes a shell and a baffle plate 2151 arranged inside the shell. The shell is formed with an inlet C1, a first outlet C2 and a second outlet C3. A first passage (such as the passage D1 at the left side in FIG. 10) is formed between the inlet C1 and the first outlet C2. A second passage (such as the passage D2 at the right side in FIG. 10) is formed between the inlet C1 and the second outlet C3. The baffle plate 2151 is configured to close one of the first passage and the second passage and to open the other one.

For example, the first outlet C2 and the second outlet C3 are aligned with adjacent two material inlets, respectively, so that the first passage and the second passage are communicated with adjacent two sand storage bins, respectively. If the baffle plate 2151 is rotated leftwards into the first passage, the first passage is closed while the second passage is opened, and the sand at the inlet C1 enters the sand storage bin communicated with the second passage through the second passage. If the baffle plate 2151 is rotated rightwards into the second passage, the second passage is closed while the first passage is opened, and the sand at the inlet C1 enters the sand storage bin communicated with the first passage through the first passage. In this way, by controlling the rotation of the baffle plate, different passages may be opened and closed, and the sand conveyed by the conveyor may be fed into the two sand storage bins respectively. The baffle plate 2151 may be rotated by driving through an electric actuator.

For example, as shown in FIG. 2 and FIG. 10, a vertical distance from a top surface where the inlet of the distributing valve 215 is located to the bottom of the sand storage device 210 is greater than a vertical distance from the top surface of the sand storage tank 211 to the bottom of the sand storage device 210. That is, the height of the top of the distributing valve 215 is greater than the height of the top surface of the sand storage device 210, and the distributing valve 215 is protruded by a distance with respect to the top surface of the sand storage device 210. A side surface P1 of the shell of the distributing valve 215 that connects the inlet C1 and the first outlet C2 is a bevel surface, and a side surface P2 of the shell connects the inlet C1 and the second outlet C3 is a bevel surface. Based on this, by arranging the distributing valve at the material inlet, a structure in relevant technologies that the cover plate is directly pushed by an electric actuator is changed, so that the position of the electric actuator is raised; moreover, by arranging the bevel surface of the distributing valve, the damage to the electric actuator caused by the sand accumulation and water accumulation is avoided.

As shown in FIG. 3, for example, the supporting frame includes an installing frame 2313 and a hanging frame 2314 connected to the installing frame, and the hanging frame 2314 is connected with guide rail frames 2315. A vertical distance from one end (the second end of the hanging frame) of the hanging frame 2314 away from the installing frame 2313 to the bottom of the supporting frame is greater than a vertical distance from one end (the first end of the hanging frame) of the hanging frame 2314 close to the installing frame 2313 to the bottom of the supporting frame. That is, the height of the second end of the hanging frame 2314 is greater than the height of the first end of the hanging frame 2314, so that the second end of the hanging frame 2314 rises up relative to the first end, for example, the hanging frame 2314 rises up by 0.6 degree with respect to the XY plane. In this way, the deformation of the hanging frame 2314 occurring after lifting the sand may be compensated, so that the lifting is more stable and reliable.

Figure 11:
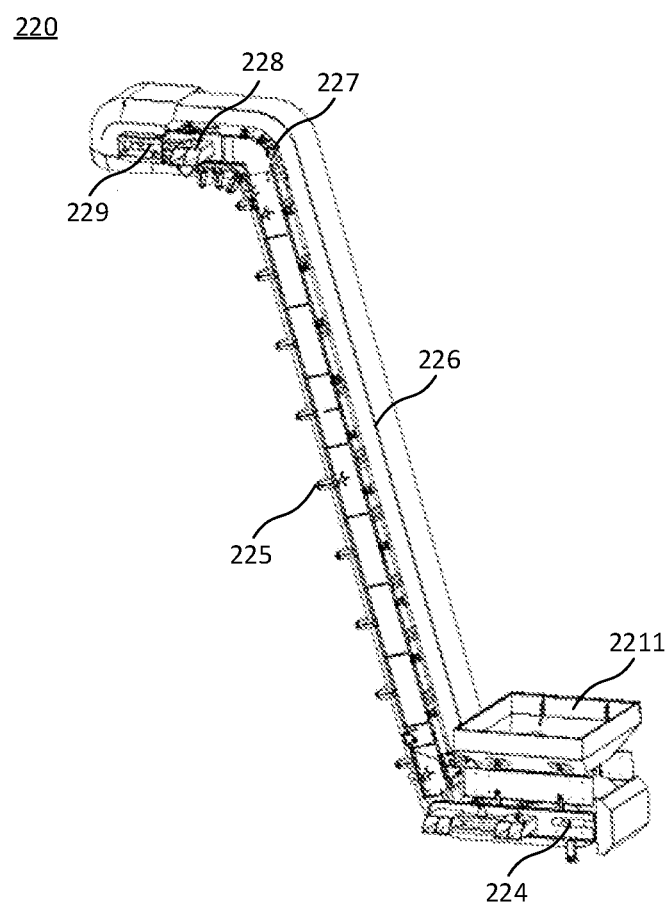
FIG. 11 illustrates a schematic diagram of a first conveying device in a sand storage and conveying apparatus provided by at least one embodiment of the present disclosure.

FIG. 11 illustrates a schematic diagram of a first conveying device provided by at least one embodiment of the present disclosure. As shown in FIG. 2 and FIG. 11, the hopper portion 221 of the first conveying device 220 includes a hopper 2211 fixedly arranged at one side of the sand storage tank. The loading portion 222 may adopt a conveyor belt type, a helical conveyor type or a bucket hoist conveyor type. The first conveying device 220 is further provided with components such as a raised edge conveyor belt 226, a driving drum 229, a turnabout drum 224, a carrier roller 225, a stop roller 227, a fixed seat 228, etc. The first conveying device 220 may adopt a fixed structure. Compared with the belt conveyor having movable guide rail as used in relevant technologies, the derailment risk of the drum of the movable structure is avoided, and the conveying apparatus of the fixed structure has relative low requirement on running conditions and ground flatness.

Figure 12:
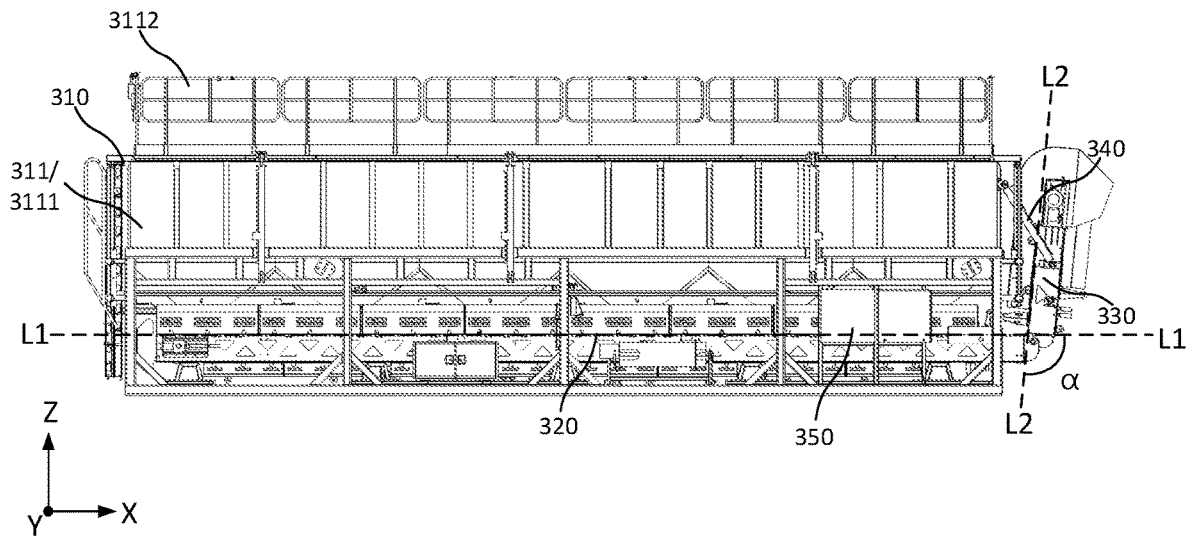
FIG. 12 illustrates a schematic diagram of another sand storage and conveying apparatus provided by at least one embodiment of the present disclosure.

FIG. 12 illustrates a schematic diagram of another sand storage and conveying apparatus provided by at least one embodiment of the present disclosure. As shown in FIG. 12, the sand storage and conveying apparatus includes a sand storage device 310, a first conveying device and a lifting device, and may further include a second conveying device 320 and a third conveying device 330. The second conveying device 320 is located at one side of the at least two sand storage tanks close to the bottom of the sand storage device, and is configured to receive and convey the sand outputted by the at least two sand storage tanks. The third conveying device 330 is connected with the second conveying device 320, and is configured to receive the sand conveyed by the second conveying device 320 and to convey the sand to a target apparatus.

For example, the sand storage device 310 may include at least two sand storage tanks 311 arranged along the first direction (such as the X-axis direction), and a material outlet may be provided below each sand storage tank 311. The second conveying device 320 may include a first conveyor belt, and a first conveyor belt driving motor for driving the first conveyor belt to run. A conveying direction of the first conveyor belt may be, for example, parallel to the first direction. The first conveyor belt may be located below the at least two sand storage tanks 311 to receive the sand falling from the material outlet of the sand storage tank 311 and convey the sand to the third conveying device 330. In an example, the sand storage tank 311 may be understood as the sand storage tank A or B as shown in FIG. 4; and in another example, the sand storage tank 311 may be understood as the sand storage bin A1, A2, B1 or B2 as shown in FIG. 4.

For example, the third conveying device 330 may include a second conveyor belt and a second conveyor belt driving motor for driving the second conveyor belt to run. In some cases, the second conveyor belt may be connected with the first conveyor belt, so that the sand on the first conveyor belt is transferred onto the second conveyor belt, and the second conveyor belt conveys the sand into other apparatus, such as a fracturing apparatus. The connection between the second conveyor belt and the first conveyor belt may be that, a transfer surface (such as a surface L2-L2) of the second conveyor belt is connected with a transfer surface (such as a surface L1-L1) of the first conveyor belt.

For example, as shown in FIG. 12, the sand storage and conveying apparatus further includes a processing device 350. For example, the processing device 350 may include a processor or a controller and the like. The processing device, for example, may be a microprocessor or a central processing unit (CPU), or other forms of processing units with data processing capacity and/or program execution capacity. The processor may be a universal processor or a dedicated processor, and may control other device(s) in the sand storage and conveying apparatus to execute the expected function(s).

Figure 13:
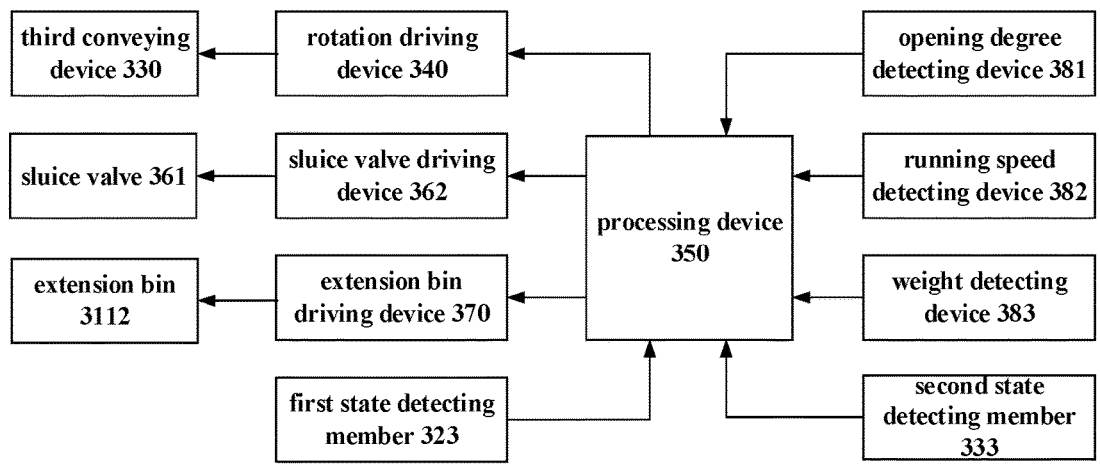
FIG. 13 illustrates a schematic diagram of a connection relationship of a processing device provided by at least one embodiment of the present disclosure.

FIG. 13 illustrates a schematic diagram of a connection relationship of a processing device provided by at least one embodiment of the present disclosure. As shown in FIG. 12 and FIG. 13, for example, the sand storage and conveying apparatus may further include a rotation driving device 340. The rotation driving device 340 is connected with the third conveying device 330 and configured to drive the third conveying device 330 to rotate relative to the second conveying device 320. The rotation driving device 340 is in communication connection with the processing device 350. The processing device 350 may send a control signal to the rotation driving device 340 so as to control the rotation driving device 340 to drive the third conveying device 330 to rotate.

For example, the rotation driving device 340, for example, may include a hydraulic cylinder (or referred to as an oil cylinder). The hydraulic cylinder includes a cylinder barrel and a piston rod. The piston rod may stretch out and withdraw back relative to the cylinder barrel. The cylinder barrel and the piston rod may be connected respectively with the sand storage device 310 and the third conveying device 330. In the stretching-and-withdrawing process of the piston rod, the third conveying device 330 may be driven to rotate, so that an angle between the second conveying device 320 and the third conveying device 330 may be changed. The angle between the second conveying device 320 and the third conveying device 330 may be an angle $\alpha$ between the transfer surface of the second conveying device 320 and the transfer surface of the third conveying device 330.

For example, in a working state, the third conveying device 330 may be controlled to rotate to be flush with the second conveying device 320, that is, the transfer surface of the third conveying device 330 is flush with the transfer surface of the second conveying device 320; or the third conveying device 330 may be controlled to be inclined downwards relative to the second conveying device 320. The angle $\alpha$ between the second conveying device 320 and the third conveying device 330, for example, may be between 180° and 250°.

For example, in a non-working state, the third conveying device 330 may be controlled to rotate to a predetermined angle, for example, rotating to a position where an angle α of 90°-120° is formed between the third conveying device 330 and the second conveying device 320, so that the third conveying device 330 is withdrawn, and the overall size of the apparatus along the first direction is further reduced.

For example, as shown in FIG. 13, the sand storage device 310 includes a sluice valve 361 and a sluice valve driving device 362. The sluice valve 361 is arranged at the material outlet of the sand storage device 310. The sluice valve driving device 362 is configured to adjust an opening degree of the sluice valve 361 so as to adjust the discharging speed of the sand storage device 310.

For example, the sand storage device 310 includes at least two sand storage tanks. The bottom of each sand storage tank may be provided with one material outlet. Each material outlet may be provided with a sluice valve 361. The sluice valve driving device 362, for example, may include a hydraulic cylinder or an electric push rod, and the piston rod of the hydraulic cylinder or the electric push rod may be used to control the opening degree of the sluice valve. For example, a sluice board in the sluice valve may block the material outlet, and the piston rod or the electric push rod may drive the sluice board to move. When the sluice board moves to different positions, the sluice board blocks the material outlet to different extents, so as to achieve different discharging speeds. The sluice valve driving device 362 is in communication connection with the processing device 350. The processing device 350 may send a control signal to the sluice valve driving device 362 to control the sluice valve driving device 362 to adjust the opening degree of the sluice valve 361.

As shown in FIG. 12 and FIG. 13, for example, each sand storage tank 311 includes a fixed tank body 3111 and an extension bin 3112. The sand storage and conveying apparatus further includes at least two extension bin driving devices 370, the at least two extension bin driving devices 370 are configured to drive the extension bins 3112 of the at least two sand storage tanks 311 to rise and fall, respectively, so as to adjust the capacity of the at least two sand storage tanks 311, respectively.

For example, each extension bin 3112 may include a plurality of coamings, for example, it may include: two coamings arranged along a first direction (the X-axis direction) and parallel to a YZ plane, and two coamings arranged along a second direction (the Y-axis direction) and parallel to an XZ plane, i.e., it may include a front coaming, a rear coaming, a left coaming and a right coaming. The four coamings are connected in sequence to form an accommodating space. The extension bin driving device may drive the extension bin 3112 to move along a third direction (the Z-axis direction) relative to the fixed tank body 3111, i.e., it may drive the extension bin 3112 to move up and down relative to the fixed tank body 3111. When the extension bin 3112 moves downwards, an overall height of the sand storage tank 311 is decreased, and the capacity of the sand storage tank 311 is reduced; and when the extension bin 3112 moves upwards, the overall height of the sand storage tank 311 is increased, and the capacity of the sand storage tank 311 is raised. The extension bin driving device 370 is in communication connection with the processing device 350. The processing device 350 may send a control signal to the extension bin driving device 370 so as to control the extension bin driving device 370 to adjust the lifting height of the extension bin 3112.

For example, each extension bin driving device 370 includes an extension bin lifting member. The extension bin lifting member drives the extension bin 3112 to rise and fall. Each extension bin driving device 370 is further configured to send the lifting height of the extension bin lifting member to the processing device 350. The processing device 350 is configured to adjust the extension bin lifting members of the at least two extension bin driving devices according to the lifting heights of the extension bin lifting members of the at least two extension bin driving devices.

For example, at least one extension bin driving device 370 may be arranged for each extension bin. The extension bin driving device 370 may include a hydraulic cylinder. The hydraulic cylinder includes a piston rod. The piston rod may be used to drive the extension bin to rise and fall. The lifting height of the extension bin is related to a retractable length of the piston rod. The extension bin lifting member may be the hydraulic cylinder. The lifting height of the extension bin lifting member may be a retractable length of the piston rod of the hydraulic cylinder. For example, the extension bin driving device 370 further includes an extension bin lifting detection part. The extension bin lifting detection member is configured to detect the lifting height of the extension bin lifting member. The lifting detection member, for example, may be a displacement sensor.

For example, the processing device 350 may communicate with the extension bin lifting detection member of each extension bin driving device. The extension bin lifting detection member of each extension bin driving device is configured to send the lifting height of the extension bin lifting member to the processing device 350. The extension bin lifting detection member and the extension bin lifting member of each extension bin driving device may be numbered, and the serial number of the extension bin lifting detection member in each extension bin driving device may correspond to the serial number of the extension bin lifting member. When the lifting detection member sends data to the processing device 350, the serial number information of the extension bin lifting detection member may be added, so that the processing device 350 determines which extension bin lifting detection member the data is sourced, thereby determining which extension bin lifting member the data corresponds to.

For example, the processing device is configured to adjust the lifting height of the extension bin lifting member of at least one extension bin driving device in the case where a difference between the lifting height of the extension bin lifting member of any one of the at least two extension bin driving devices and an average value of the lifting heights of the extension bin lifting members of the other extension bin driving devices is greater than a predetermined threshold value, so that the difference between the lifting height of the extension bin lifting member of any one of the at least two extension bin driving devices and the average value of the lifting heights of the extension bin lifting members of the other extension bin driving devices is less than or equal to the predetermined threshold value.

For example, after receiving the data from all extension bin lifting detection members, the processing device may determine the lifting height of each extension bin lifting member according to the data of the extension bin lifting detection member. When it is detected that the difference between the lifting height of any extension bin lifting member (such as the first extension bin lifting member) and the average lifting height of the other extension bin lifting members is greater than a preset error threshold value (the predetermined threshold value), at least the lifting height of the extension bin lifting member (such as the first extension bin lifting member) is adjusted until the difference between the lifting height of any extension bin lifting member and the average value of the lifting heights of the other extension bin lifting members is less than or equal to the preset error threshold value. For example, the error threshold value may be determined according to the actual requirement, which is not limited by the embodiments of the present disclosure. For example, the sand storage and conveying apparatus includes three sand storage tanks. The first sand storage tank includes a first extension bin lifting member and a first extension bin lifting detection member for detecting the lifting height of the first extension bin lifting member. The second sand storage tank includes a second extension bin lifting member and a second extension bin lifting detection member for detecting the lifting height of the second extension bin lifting member. The third sand storage tank includes a third extension bin lifting member and a third extension bin lifting detection member for detecting the lifting height of the third extension bin lifting member. If it is detected that the difference between the lifting height of the first extension bin lifting member and the average lifting height of the second extension bin lifting member and the third extension bin lifting member is greater than a predetermined threshold value, at least the lifting height of the first extension bin lifting member is adjusted, so that the difference between the lifting height of any extension bin lifting member (the first extension bin lifting member, the second extension bin lifting member or the third extension bin lifting member) and the average lifting height of the other extension bin lifting members is less than or equal to the predetermined threshold value. Based on this, the error of the lifting height of the extension bin lifting member may be kept within a reasonable range, so that the heights of the extension bins of all of the sand storage tanks are ensured to be consistent, thereby keeping the capacity of the sand storage tanks consistent.

For example, each extension bin includes M coamings, where M is an integer greater than 1. The shape of the coaming is a planer plate shape, a folded-plate shape (such as an L shape), an arc shape, a semicircular shape and the like. For example, four coamings of planer plate shape may form one extension bin. Two coamings of folded-plate shape may form one extension bin. Each sand storage tank may include M coaming driving devices. The M coaming driving devices are used to drive the M coamings to rise and fall (i.e. to move along the third direction), respectively. The processing device is in communication connection with M coaming driving devices of each extension bin, respectively, so as to control the M coaming driving devices of each extension bin to drive the M coamings to rise and fall, respectively.

For example, the processing device is further configured to adjust coaming lifting members of the M coaming driving devices according to the lifting heights of the coaming lifting members of M coaming driving devices for each sand storage tank. For example, the coaming driving device may be a hydraulic cylinder. The hydraulic cylinder includes a piston rod. The piston rod may be used to drive the coaming to rise and fall. The lifting height of the coaming is related to a retractable length of the piston rod. The coaming lifting member may be a hydraulic cylinder. The lifting height of the coaming lifting member may be the retractable length of the piston rod of the hydraulic cylinder. For example, each coaming driving device also includes a coaming lifting detection member. The coaming lifting detection member is configured to detect the lifting height of the coaming lifting member. The coaming lifting detection member, for example, may be a displacement sensor.

For example, the processing device is configured to adjust the lifting height of the coaming lifting member of at least one coaming driving device for each sand storage tank in the case where the difference between the lifting height of the coaming lifting member of any coaming driving device of the M coaming driving devices and the average value of the lifting heights of the coaming lifting members of the other coaming driving devices is greater than a predetermined threshold value, so that the difference between the lifting height of the coaming lifting member of any coaming driving device of the M coaming driving devices and the average value of the lifting heights of the coaming lifting members of the other coaming driving devices is less than or equal to the predetermined threshold value.

For example, for each sand storage tank, after receiving the data of the coaming lifting detection members of M coaming driving devices, the processing device may determine the lifting height of each coaming lifting member according to the data of the coaming lifting detection member. When it is detected that the difference between the lifting height of any coaming lifting member (such as the first coaming lifting member) and the average lifting height of the other coaming lifting members is greater than a preset error threshold value (the predetermined threshold value), at least the lifting height of the coaming lifting member (such as the first coaming lifting member) may be adjusted until the difference between the lifting height of any coaming lifting member and the average lifting height of the other coaming lifting members is less than or equal to the preset error threshold value. For example, the error threshold value may be determined according to the actual requirement, which is not limited by the embodiments of the present disclosure. For example, a certain sand storage tank includes three coaming driving devices: a first coaming driving device, a second coaming driving device and a third coaming driving device. The first coaming driving device includes a first coaming lifting member and a first coaming lifting detection member for detecting the lifting height of the first coaming lifting member. The second coaming driving device includes a second coaming lifting member and a second coaming lifting detection member for detecting the lifting height of the second coaming lifting member. The third coaming driving device includes a third coaming lifting member and a third coaming lifting detection member for detecting the lifting height of the third coaming lifting member. If it is detected that the difference between the lifting height of the first coaming lifting member and the average lifting height of the second coaming lifting member and the third coaming lifting member is greater than a predetermined threshold value, at least the lifting height of the first coaming lifting member is adjusted, so that the difference between the lifting height of any coaming lifting member (the first coaming lifting member, the second coaming lifting member or the third coaming lifting member) and the average lifting height of the other coaming lifting members is less than or equal to the predetermined threshold value. Based on this, the error of the lifting height of the coaming lifting member in each sand storage tank may be kept within a reasonable range, thereby keeping the heights of the coamings of each sand storage tank consistent.

For example, in the case where each sand storage tank is provided with M coaming driving devices, the extension bin driving device of each sand storage tank may be any one of the M coaming driving devices included in the sand storage tank.

Figure 14:
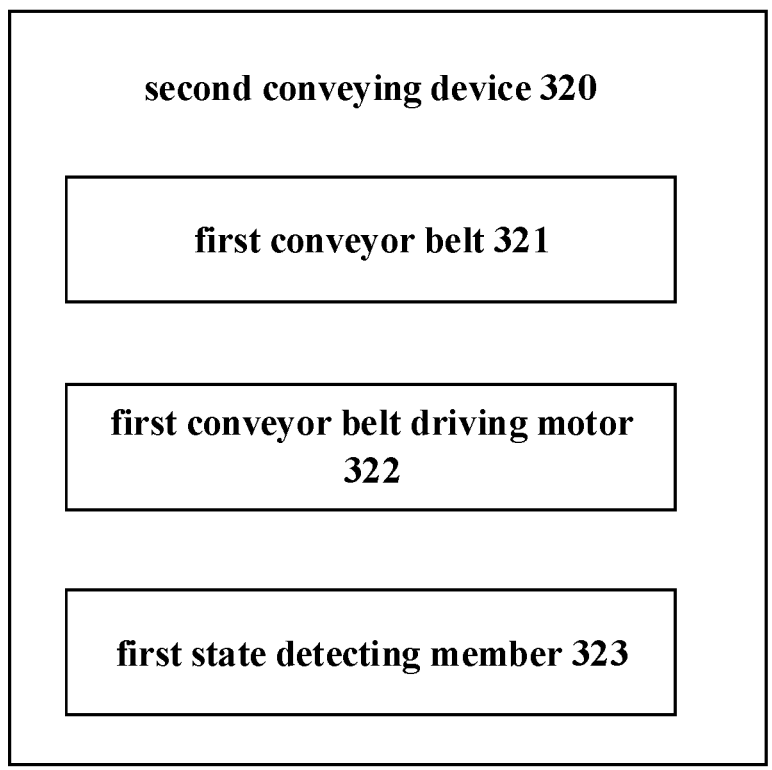
FIG. 14 illustrates a schematic block diagram of a second conveying device in a sand storage and conveying apparatus provided by at least one embodiment of the present disclosure.

FIG. 14 illustrates a schematic block diagram of a second conveying device provided by at least one embodiment of the present disclosure. As shown in FIG. 14, for example, the second conveying device 320 includes a first conveyor belt 321, a first conveyor belt driving motor 322 for driving the first conveyor belt 321 to run and a first state detecting member 323 for detecting a running state of the first conveyor belt 321. As shown in FIG. 13, the first state detecting member 323 is in communication connection with the processing device 350.

Figure 15:
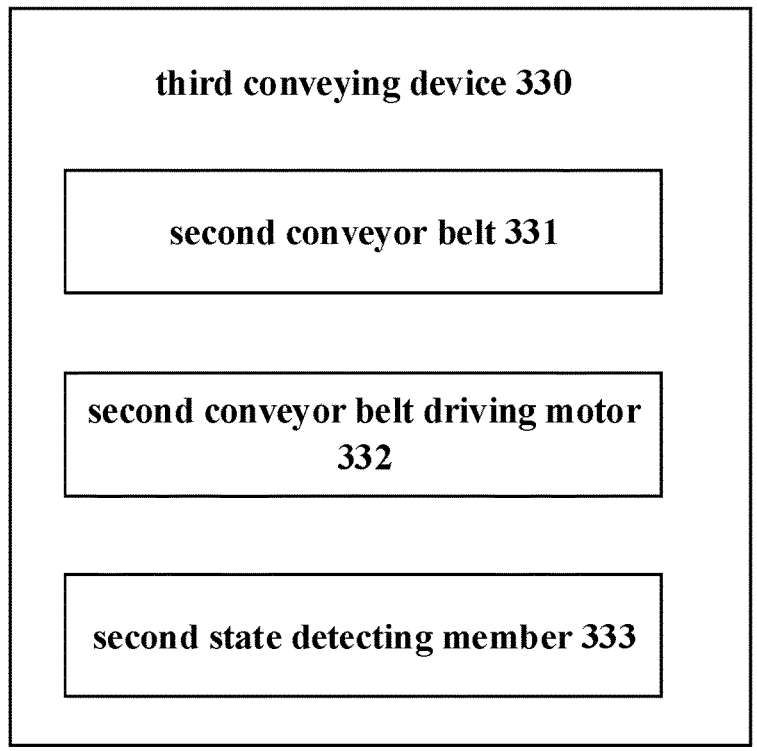
FIG. 15 illustrates a schematic block diagram of a third conveying device in a sand storage and conveying apparatus provided by at least one embodiment of the present disclosure.

FIG. 15 illustrates a schematic block diagram of a third conveying device provided by at least one embodiment of the present disclosure. As shown in FIG. 15, for example, the third conveying device 330 includes a second conveyor belt 331, a second conveyor belt driving motor 332 for driving the second conveyor belt 331 to run and a second state detecting member 333 for detecting a running state of the second conveyor belt 331. As shown in FIG. 13, the second state detecting member 333 is in communication connection with the processing device 350.

For example, the second state detecting member 333 is also configured to send the running state information of the second conveyor belt 331 to the processing device 350. The processing device 350 is further configured to control the first conveyor belt driving motor to stop running in the case where the running state information indicates that the second conveyor belt 331 stops running.

For example, the first state detecting member 323 is also configured to send the running state information of the first conveyor belt 321 to the processing device 350. The processing device 350 is also configured to control the sluice valve driving device to close the sluice valve in the case where the running state information indicates that the first conveyor belt 321 stops running.

For example, in an example, the first state detecting member 323 may be a speed sensor. The speed sensor is used to detect a running speed of the first conveyor belt 321. The running speed of the first conveyor belt 321 may be used as the running state information of the first conveyor belt 321, so that the processing device may judge whether the first conveyor belt 321 runs normally or not according to the running speed of the first conveyor belt 321. For example, when the running speed of the first conveyor belt 321 is less than a speed threshold value, it may be considered that the first conveyor belt 321 stops running. Similarly, the second state detecting member 333 may also be a speed sensor and used to detect the running speed of the second conveyor belt 331. The running speed of the second conveyor belt 331 may be used as the running state information of the second conveyor belt 331.

For example, in another example, the first state detecting member may include a switch sensor (such as an approach switch) or a coder. The switch sensor or the coder may be installed on the first conveyor belt driving motor and used to monitor the running speed of a motor output shaft of the first conveyor belt driving motor. The running speed of the motor output shaft of the first conveyor belt driving motor may be used as the running state information of the first conveyor belt 321, so that the processing device may judge whether the first conveyor belt 321 runs normally or not according to the running speed of the motor output shaft of the first conveyor belt driving motor. For example, when the running speed of the motor output shaft of the first conveyor belt driving motor is less than a speed threshold value, it may be considered that the first conveyor belt 321 stops running. Similarly, the second state detecting member may also be a switch sensor or a coder and used to monitor the running speed of the motor output shaft of the second conveyor belt driving motor. The running speed of the motor output shaft of the second conveyor belt driving motor may be used as the running state information of the second conveyor belt 331.

For example, when detecting that the second conveyor belt 331 of the third conveying device 330 stops running, the processing device controls the first conveyor belt driving motor of the second conveying device 320 to stop running too, so that the first conveyor belt 321 of the second conveying device 320 stops running. Based on this, it can prevent the sand conveyed by the first conveyor belt 321 from being accumulated on the second conveyor belt 331 when the second conveyor belt 331 is stopped.

For example, when detecting that the first conveyor belt 321 stops running, the processing device 350 controls the sluice valve driving device to close the sluice valve, for example, closing the sluice valves of all the sand storage tanks, and the material outlet of the sand storage tank is closed, so that the sand in the sand storage tank cannot fall onto the first conveyor belt 321. Based on this, it can prevent the sand from being accumulated on the first conveyor belt 321.

For example, when the second conveyor belt 331 stops running, the first conveyor belt 321 is controlled to stop running, so that the primary interlocking protection may be realized. When the first conveyor belt 321 stops running, the sluice valve is controlled to be closed so as to realize the secondary interlocking protection. The double interlocking may minimize the sand accumulation and have a protection effect on the apparatus.

For example, as shown in FIG. 13, the sand storage and conveying apparatus further includes an opening degree detecting device 381, a running speed detecting device 382 and a weight detecting device 383. The opening degree detecting device 381, the running speed detecting device 382 and the weight detecting device 383 are in communication connection with the processing device 350.

For example, the opening degree detecting device 381 is configured to detect an actual opening degree of the sluice valve and send the actual opening degree to the processing device. The opening degree detecting device may be a switch sensor (such as an approach switch) or a distance sensor. The switch sensor or the distance sensor may detect the position of the sluice board in the sluice valve, so that the opening degree of the sluice valve is detected.

For example, the running speed detecting device 382 is configured to detect an actual running speed of the first conveyor belt and send the actual running speed to the processing device. The running speed detecting device may be a speed sensor. The running speed detecting device and the first state detecting member may be the same one device.

For example, the weight detecting device 383 is configured to detect an actual sand feeding quantity of the sand storage device and send the actual sand feeding quantity to the processing device. For example, the weight detecting device may be a weight sensor. The weight sensor may include at least one of an electronic belt scale installed below the first conveyor belt, a weighing sensor installed at the lower portion of each sand storage tank and a material level measuring instrument located in the sand storage tank. For example, the electronic belt scale installed below the first conveyor belt may realize instantaneous and cumulative measuring functions of the sand quantity to acquire the measurement data. The instantaneous flow is calculated by measuring a weight difference at different moments. In the calculation process, in order to prevent from incorrect data due to instantaneous fluctuation or incorrect measurement, the data may be compared and judged. When the data is too large or too small, it is considered as invalid data by the system; and after the invalid data is removed, the instantaneous flow at this moment is obtained by performing weighted averaging on all the valid data. For example, the material level measuring instrument may measure a material level by radar, ultrasonic, wires, guided wave radar, laser, capacitance, inductance or other methods. Furthermore, an intermittent measurement of the material level may also be realized by a plurality of switch sensors installed on a material wall. The switch sensors include but are not limited to capacitive switches, inductive switches, tuning fork switches, mechanical switches, etc.

For example, the processing device 350 is further configured to send a control signal to the sluice valve driving device to control the opening degree of the sluice valve, according to a target sand feeding quantity and type information of the sand in the sand storage device; determine a theoretical sand feeding quantity according to the actual opening degree of the sluice valve and the type information of the sand; control the running speed of the first conveyor belt according to the theoretical sand feeding quantity; and send the control signal to the rotation driving device according to the running speed of the first conveyor belt and the theoretical sand feeding quantity so as to control an inclined angle of the third conveying device relative to the second conveying device.

For example, the type information of the sand may include density information of the sand. The density information may include an actual density and an apparent density.

For example, the target sand feeding quantity may be preset according to the actual requirement, and the opening degree of the sluice valve may be determined according to the target sand feeding quantity and the density information of the sand. For example, the processor may store some matched data. The matched data may include correspondences between, various sand feeding quantities and various density information, and, various opening degrees of the sluice valve. The target sand feeding quantity and the density information of the sand may be matched with the matched data so as to find the corresponding opening degree information of the sluice valve from the matched data and use the corresponding opening degree information as the theoretical opening degree of the sluice valve. The processing device 350 may control the sluice valve driving device to adjust the opening degree of the sluice valve to the theoretical opening degree. In an example, a plurality of sand storage tanks may supply the sand in sequence. For example, the sluice valve of the first sand storage tank is opened firstly, so that the first sand storage tank is used to supply the sand, and the sluice valves of other sand storage tanks are closed. When the remaining quantity of the sand in the first sand storage tank is small, the first sand storage tank is closed, and the sluice valve of the second sand storage tank is opened, so that the second sand storage tank is used to supply the sand, and so on. In this example, controlling the opening degree of the sluice valve may refer to controlling the opening degree of the sluice valve of the sand storage tank responsible for sand supply at this moment. In another example, two or more sand storage tanks may be used together to supply the sand. In an example, controlling the opening degree of the sluice valve may refer to controlling the opening degree of the sluice valve of each of the two or more sand storage tanks responsible for the sand supply.

For example, the actual opening degree of the sluice valve may be determined according to the data sent by the opening degree detecting device, and then the current theoretical sand feeding quantity may be determined according to the actual opening degree of the sluice valve and the type information of the sand. The theoretical sand feeding quantity may be determined by finding the matched data.

For example, the theoretical running speed of the first conveyor belt may be determined according to the theoretical sand feeding quantity. The matched data may also include the correspondences between various sand feeding quantities and various running speeds, and the theoretical sand feeding quantities may be matched with the matched data to find the corresponding running speed from the matched data and use the corresponding running speed as the theoretical running speed of the first conveyor belt. The processing device 350 may control the first conveyor belt driving motor to adjust the running speed of the first conveyor belt to the theoretical running speed.

For example, the inclined angle of the third conveying device 330 may be determined according to the theoretical running speed of the first conveyor belt and the theoretical sand feeding quantity. The inclined angle of the third conveying device 330 may be an angle $\alpha$ between the third conveying device 330 and the second conveying device 320. For example, the matched data may also include the correspondences between, various running speeds and various sand feeding quantities, and, various inclined angles, and the theoretical running speed of the first conveyor belt and the theoretical sand feeding quantity may be matched with the matched data so as to find the corresponding inclined angle from the matched data and use the corresponding inclined angle as the theoretical inclined angle of the third conveying device 330. The processing device 350 may control the rotation driving device 340 to adjust the inclined angle of the third conveying device 330 to the theoretical inclined angle.

For example, the processing device 350 is further configured to control the running speed of the second conveying device in real time, according to the actual sand feeding quantity and the actual running speed.

For example, in the running process of the second conveying device and the third conveying device, the actual sand feeding quantity of the weight detecting device may be received in real time (for example, every predetermined duration, and the predetermined duration is, for example, 1 to 10 seconds) to obtain the theoretical running speed of the first conveyor belt, and the first conveyor belt driving motor is controlled to adjust the running speed of the first conveyor belt to the theoretical running speed. Furthermore, whether the actual running speed of the first conveyor belt is adjusted to the theoretical running speed or not is verified through the actual running speed from the running speed detecting device; and if not, the running speed of the first conveyor belt is adjusted continuously until the actual running speed of the first conveyor belt reaches the theoretical running speed. Based on this, the running speed of the first conveyor belt can be adjusted in real time to ensure that the first conveyor belt works in an optimal state, so that not only can the normal running of the system be guaranteed, but also the energy waste can be avoided.

The sand storage and conveying apparatus provided by the embodiments of the present disclosure may adjust the components such as the sluice valve, the second conveying device and the third conveying device automatically, and may save the manpower, so that the adjustment and control operations are more accurate.

An embodiment of the present disclosure further provides a control method for the sand storage and conveying apparatus.

Figure 16:
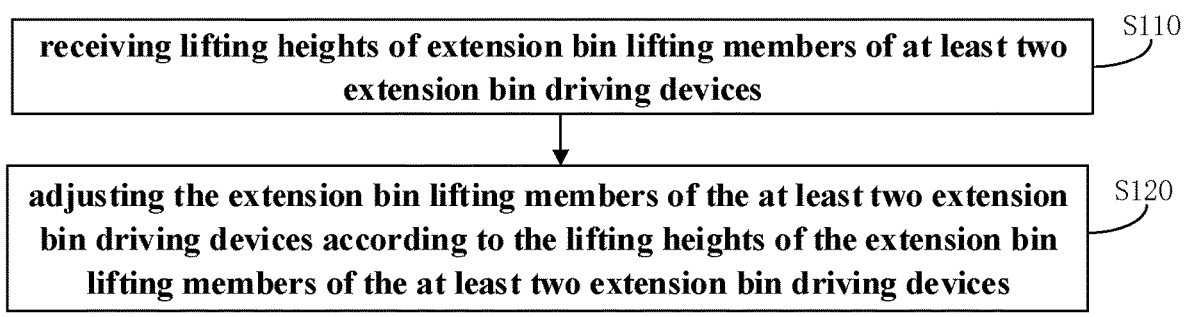
FIG. 16 illustrates a schematic flow chart of a control method provided by at least one embodiment of the present disclosure.

FIG. 16 illustrates a schematic flow chart of a control method provided by at least one embodiment of the present disclosure. As shown in FIG. 16, the control method may include steps S110 and S120.

Step S110: receiving lifting heights of extension bin lifting members of at least two extension bin driving devices.

Step S120: adjusting the extension bin lifting members of the at least two extension bin driving devices according to the lifting heights of the extension bin lifting members of the at least two extension bin driving devices.

For example, the step S120 may further include: adjusting the lifting height of the extension bin lifting member of at least one extension bin driving device in the case where a difference between the lifting height of the extension bin lifting member of any one of the at least two extension bin driving devices and an average value of the lifting heights of the extension bin lifting members of other extension bin driving devices is greater than a predetermined threshold value, so that the difference between the lifting height of the extension bin lifting member of any one of the at least two extension bin driving devices and the average value of the lifting heights of the extension bin lifting members of the other extension bin driving devices is less than or equal to the predetermined threshold value.

Figure 17:
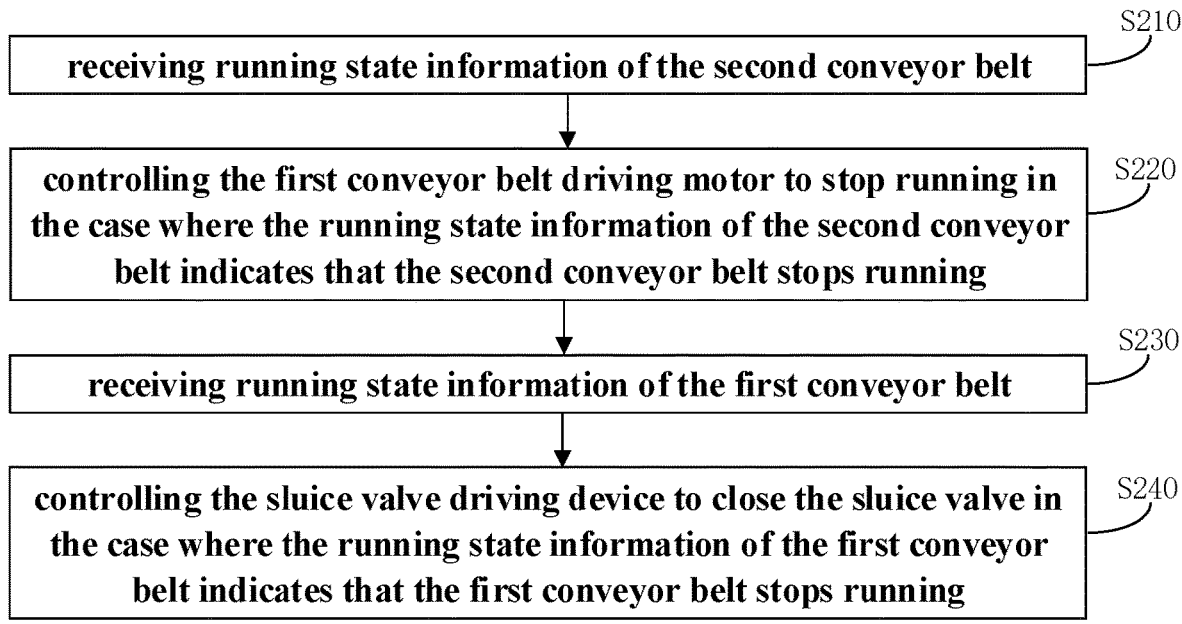
FIG. 17 illustrates a schematic flow chart of another control method provided by at least one embodiment of the present disclosure.

FIG. 17 illustrates a schematic flow chart of another control method provided by at least one embodiment of the present disclosure. As shown in FIG. 17, the control method may further include steps S210-S240.

Step S210: receiving running state information of the second conveyor belt.

Step S220: controlling the first conveyor belt driving motor to stop running in the case where the running state information of the second conveyor belt indicates that the second conveyor belt stops running.

Step S230: receiving running state information of the first conveyor belt.

Step S240: controlling the sluice valve driving device to close the sluice valve in the case where the running state information of the first conveyor belt indicates that the first conveyor belt stops running.

Figure 18:
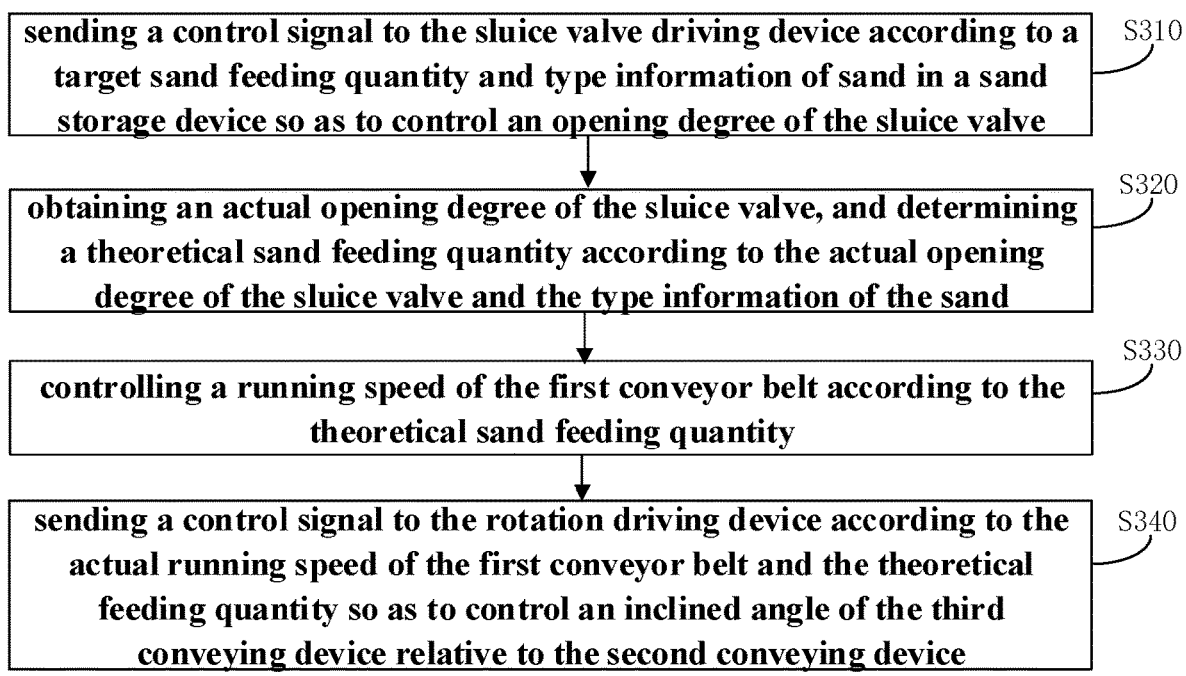
FIG. 18 illustrates a schematic flow chart of yet another control method provided by at least one embodiment of the present disclosure.

FIG. 18 illustrates a schematic flow chart of another control method provided by at least one embodiment of the present disclosure. As shown in FIG. 18, the control method may further include steps S310-S340.

Step S310: sending a control signal to the sluice valve driving device according to a target sand feeding quantity and type information of sand in a sand storage device so as to control an opening degree of the sluice valve.

Step S320: obtaining an actual opening degree of the sluice valve, and determining a theoretical sand feeding quantity according to the actual opening degree of the sluice valve and the type information of the sand.

Step S330: controlling a running speed of the first conveyor belt according to the theoretical sand feeding quantity.

Step S340: sending a control signal to the rotation driving device according to the actual running speed of the first conveyor belt and the theoretical feeding quantity so as to control an inclined angle of the third conveying device relative to the second conveying device.

For example, the control method may further include: controlling the running speed of the first conveyor belt in real time according to the actual sand feeding quantity and the actual running speed of the first conveyor belt.

Figure 19:
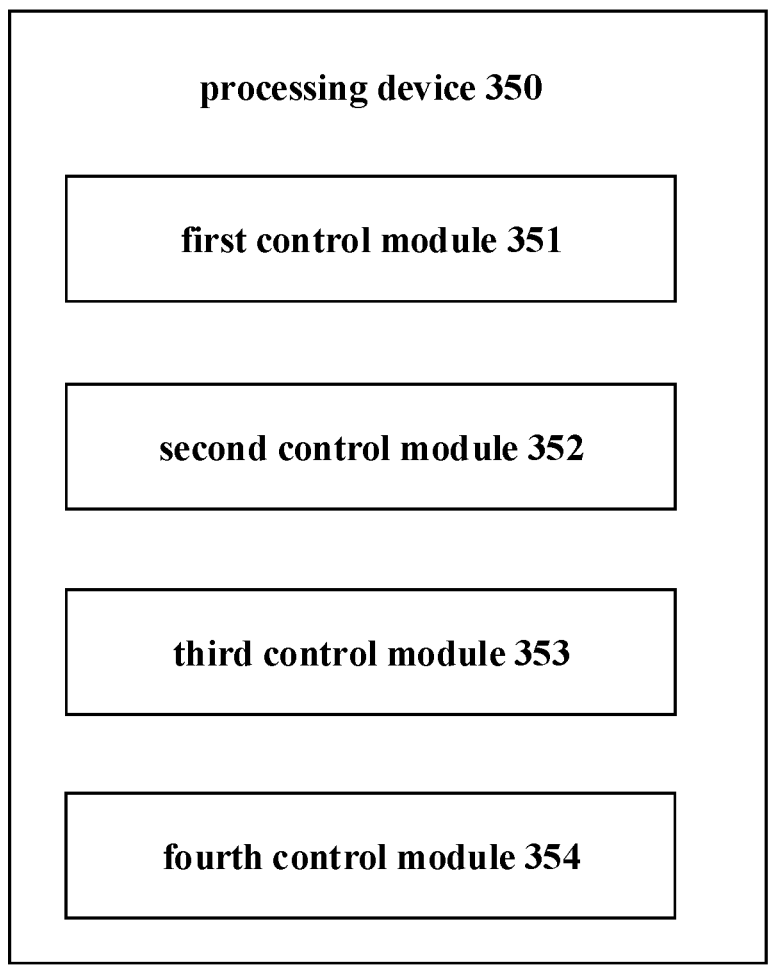
FIG. 19 illustrates a schematic block diagram of a processing device provided by at least one embodiment of the present disclosure.

FIG. 19 illustrates a schematic block diagram of a processing device provided by at least one embodiment of the present disclosure. As shown in FIG. 19, for example, the processing device 350 may include a first control module 351, a second control module 352, a third control module 353 and a fourth control module 354.

The first control module 351 is configured to adjust the extension bin lifting members of the at least two extension bin driving devices according to the lifting heights of the extension bin lifting members of the at least two extension bin driving devices.

The first control module 351 may be further configured to adjust the lifting height of the extension bin lifting member of at least one extension bin driving device in the case where a difference between the lifting height of the extension bin lifting member of any one of the at least two extension bin driving devices and an average value of the lifting heights of the extension bin lifting members of other extension bin driving devices is greater than a predetermined threshold value, so that the difference between the lifting height of the extension bin lifting member of any one of the at least two extension bin driving devices and the average value of the lifting heights of the extension bin lifting members of the other extension bin driving devices is less than or equal to the predetermined threshold value.

The second control module 352 is configured to control the first conveyor belt driving motor to stop running in the case where the running state information of the second conveyor belt indicates that the second conveyor belt stops running.

The third control module 353 is configured to control the sluice valve driving device to close the sluice valve in the case where the running state information of the first conveyor belt indicates that the first conveyor belt stops running.

The fourth control module 354 is configured to send a control signal to the sluice valve driving device to control the opening degree of the sluice valve according to the target sand feeding quantity and the type information of the sand in the sand storage device; determine the theoretical sand feeding quantity according to the actual opening degree of the sluice valve and the type information of the sand; control the running speed of the first conveyor belt according to the theoretical sand feeding quantity; and send the control signal to the rotation driving device according to the actual running speed of the first conveyor belt and the theoretical sand feeding quantity so as to control the inclined angle of the third conveying device relative to the second conveying device.

The fourth control module 354 may be further configured to control the running speed of the first conveyor belt in real time according to the actual sand feeding quantity and the actual running speed of the first conveyor belt.

For example, the first control module, the second control module, the third control module and the fourth control module may be hardware, software, firmware and any feasible combinations thereof. For example, the first control module, the second control module, the third control module and the fourth control module may be dedicated or universal circuit, chip or device, and may also be a combination of a processor and a memory. The embodiments of the present disclosure do not limit the specific implementations of the above-mentioned units.

At least one embodiment of the present disclosure further provides an electronic apparatus.

Figure 20:
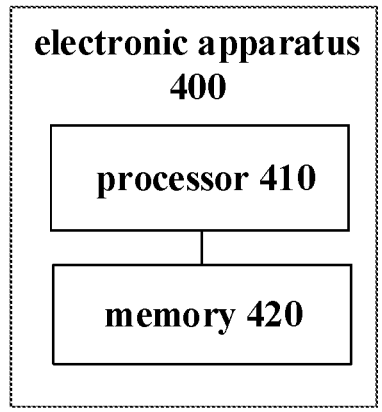
FIG. 20 illustrates a schematic block diagram of an electronic apparatus provided by at least one embodiment of the present disclosure.

FIG. 20 illustrates a schematic block diagram of an electronic apparatus provided by at least one embodiment of the present disclosure. As shown in FIG. 20, the electronic apparatus 400 includes a processor 410 and a memory 420. The memory 420 is configured to store non-transitory computer readable instructions (such as one or more computer program modules). The processor 410 is configured to execute the non-transitory computer readable instructions, and when the non-transitory computer readable instructions are executed by the processor 410, one or more steps of the control method for the sand storage and conveying apparatus described above may be implemented. The memory 420 and the processor 410 may be connected with each other through a bus system and/or connecting mechanisms (not shown) in other forms.

For example, the processor 410 may be a central processing unit (CPU), a graphics processing unit (GPU) or other forms of processing units with data processing capacity and/or program execution capacity. For example, the CPU may be of an X86 or ARM architecture. The processor 410 may be a universal processor or a dedicated processor, and may control other components in the electronic apparatus 400 to execute the expected functions.

For example, the memory 420 may include any combination of one or more computer program products. The computer program product may include various forms of computer-readable storage mediums, such as volatile memory and/or nonvolatile memory. The volatile memory, for example, may include a random access memory (RAM) and/or a cache. The nonvolatile memory, for example, may include a read-only memory (ROM), a hard disk, an erasable programmable read-only memory (EPROM), a portable compact disk read-only memory (CD-ROM), a USB memory, a flash memory, etc. One or more computer program modules may be stored on the computer readable storage medium. The processor 410 may run one or more computer program modules to realize various functions of the electronic apparatus 400. Various application programs and various data as well as various data used and/or generated by the application programs may also be stored in the computer readable storage medium.

It should be noted that in the embodiment of the present disclosure, the specific functions and technical effects of the electronic apparatus 400 may refer to the above description about the control method for the sand storage and conveying apparatus and are not repeated here.

Figure 21:
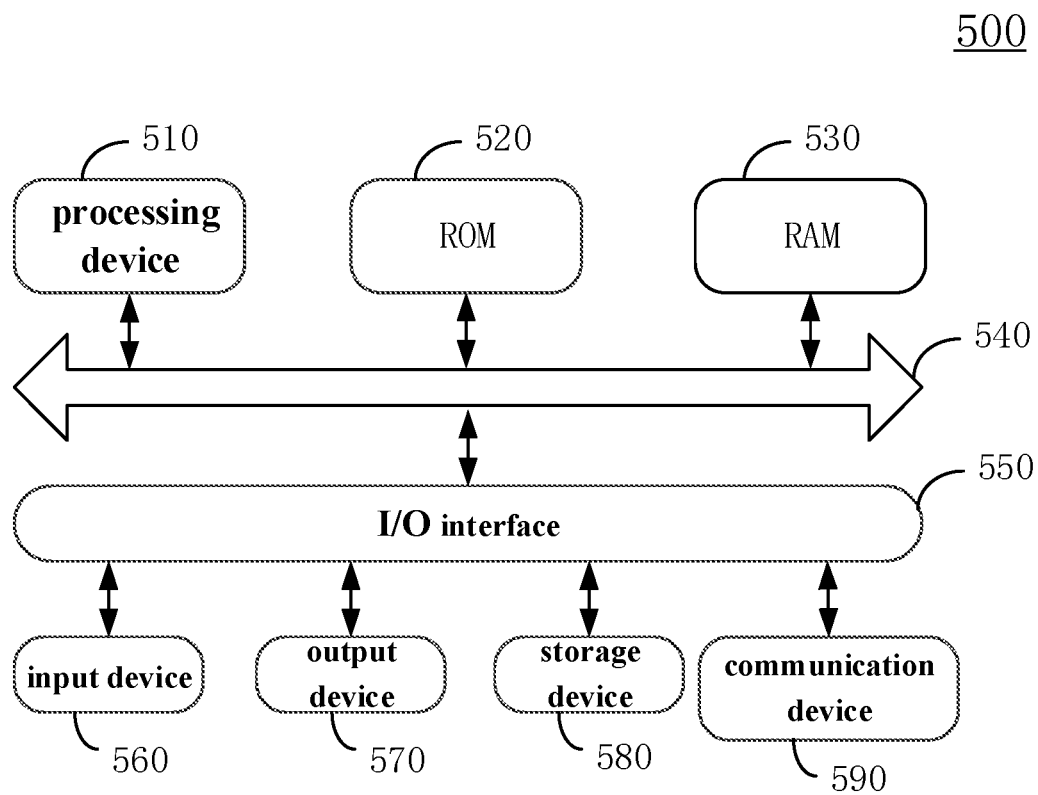
FIG. 21 is a structural schematic diagram of another electronic apparatus provided by at least one embodiment of the present invention.

FIG. 21 is a structural schematic diagram of another electronic apparatus provided by at least one embodiment of the present invention.

The electronic apparatus 500 shown in FIG. 21, for example, is suitable for implementing the control method for the sand storage and conveying apparatus provided by the embodiments of the present disclosure. The electronic apparatus 500 may be a terminal device such as a personal computer, a notebook computer, a tablet computer, a mobile phone, or a workstation, a server, a cloud service, etc. It should be noted that the electronic apparatus 500 shown in FIG. 21 is merely an example, which may not bring any limitation on the functions and application range of the embodiments of the present disclosure.

As shown in FIG. 21, the electronic apparatus 500 may include a processing device (such as a central processor, a graphics processor, etc.) 510, which may execute various proper actions and processes according to programs stored in a read-only memory (ROM) 520 or programs loaded into a random access memory (RAM) 530 from a storage device 580. Various programs and data for operations of the electronic apparatus 500 for the sand conveying apparatus are also stored in the RAM 530. The processing device 510, the ROM 520 and the RAM 530 are connected with one another through a bus 540. An input/output (I/O) interface 550 is also connected to the bus 540.

Generally, the devices that may be connected to the I/O interface 550 includes an input device 560 such as a touch screen, a touch pad, a keyboard, a mouse, a camera, a microphone, an accelerometer, a gyroscope, etc.; an output device 570 such as a liquid crystal display (LCD), a speaker, a vibrator, etc.; a storage device 580 such as a magnetic tape, a hard disk, etc.; and a communication device 590. The communication device 590 may allow the electronic apparatus 500 to communicate with other electronic apparatuses in wireless or wired manner to exchange data. Although FIG. 21 shows the electronic apparatus 500 including various devices, it should be understood that it is not required to implement or have all the illustrated devices, and the electronic apparatus 500 may alternatively implement or have more or less devices.

For example, according to the embodiments of the present disclosure, the above control method for the sand storage and conveying apparatus may be realized as a computer software program. For example, an embodiment of the present disclosure includes a computer program product including a computer program carried on a non-transitory computer readable medium, and the computer program includes program codes for executing the above control method. In such an embodiment, the computer program may be downloaded and installed from the network by the communication device 590, or installed from the storage device 580, or installed from the ROM 520. When the computer program is executed by the processing device 510, the functions specified in the control method for the sand storage and conveying apparatus provided by the embodiments of the present disclosure may be performed.

At least one embodiment of the present disclosure also provides a storage medium for storing non-transitory computer program executable codes (such as computer executable instructions), which may realize the control method for the sand storage and conveying apparatus described in any embodiment of the present disclosure when executed by a computer; or may realize the control method for sand storage and conveying apparatus described in any embodiment of the present disclosure when the executable codes of the non-transitory computer program are executed by the computer.

Figure 22:
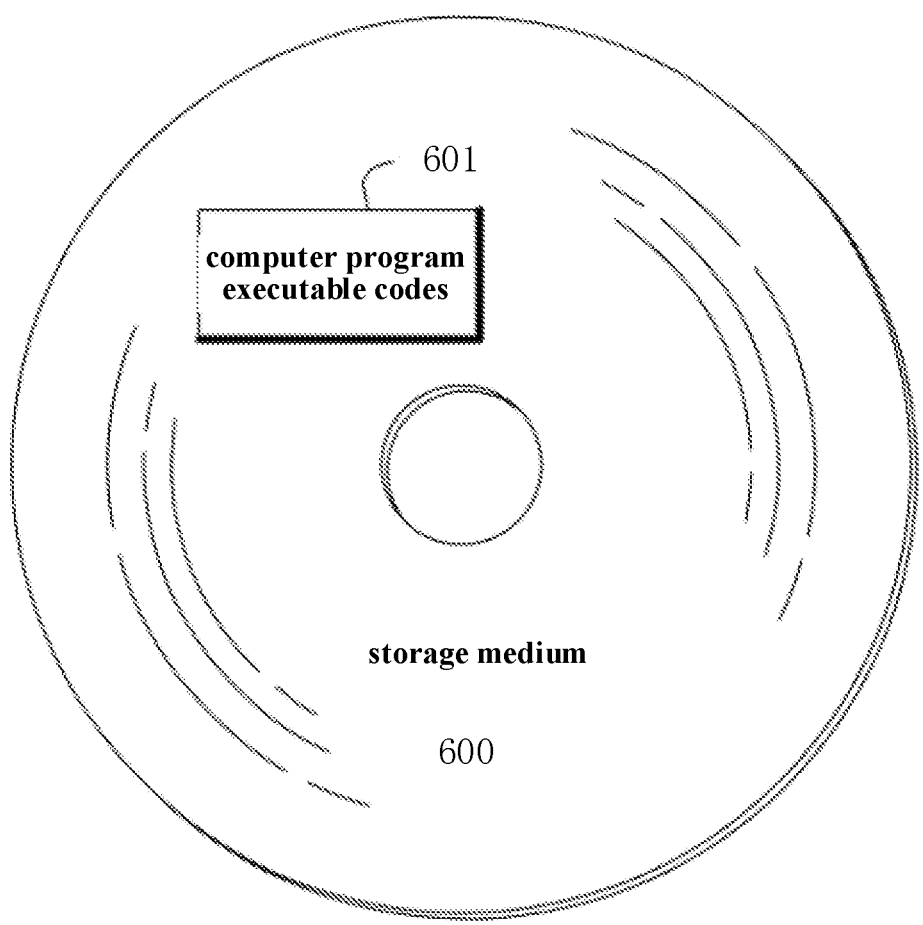
FIG. 22 is a schematic diagram of a storage medium provided by at least one embodiment of the present disclosure.

FIG. 22 is a schematic diagram of a storage medium provided by at least one embodiment of the present disclosure. As shown in FIG. 22, the storage medium 600 stores computer program executable codes 601 non-temporarily. For example, when the computer program executable codes 601 are executed by the computer, one or more steps in the control method for the sand storage and conveying apparatus may be performed.

For example, the storage medium 600 may be applied to the above electronic apparatus 400 or the above electronic apparatus 500. For example, the storage medium 600 may be the memory 420 in the electronic apparatus 400 or the storage device 580 in the electronic apparatus 500. For example, relevant descriptions about the storage medium 600 may refer to the corresponding description of the memory 420 in the electronic apparatus 400 shown in FIG. 20 or the storage device 580 in the electronic apparatus 500 shown in FIG. 21, and will not be repeated here.

The invention claimed is:

1. A sand storage and conveying apparatus, comprising:
   a sand storage device, comprising at least two sand storage tanks arranged along a first direction;

at least two first conveying devices, wherein the at least two first conveying devices are arranged along the first direction and configured to convey sand to the at least two sand storage tanks, respectively; and a lifting device, comprising:
 a supporting frame; and
 at least two lifting members connected onto the supporting frame, wherein the at least two lifting members are arranged along the first direction, each of the at least two lifting members is configured to lift a container with sand and place the container with sand into at least one of the first conveying devices, and each of the at least two lifting members comprises:
  a movable frame, connected to the supporting frame and configured to move along the first direction relative to the supporting frame; and
  a fetching member connected to the movable frame and configured to move along a second direction and a third direction relative to the movable frame, wherein the fetching member is further configured to be detachably connected with the container, the second direction is along the sand storage device and the lifting device, and the third direction intersects with a plane where the first direction and the second direction are located, wherein the at least two movable frames of the at least two lifting members are arranged along the first direction.

2. The apparatus according to claim 1, wherein
the supporting frame comprises a guide rail frame extending along the first direction, and the guide rail frame is provided with a sliding guide rail connected with the at least two movable frames; and
the at least two movable frames are configured to move between a first end and a second end of the sliding guide rail, respectively.

3. The apparatus according to claim 1, wherein
each of the at least two sand storage tanks comprises a top surface, the top surface comprises a planar area and a bevel area, the planar area is provided with a material inlet, and the bevel area is inclined from an edge of the planar area towards a bottom of the sand storage device; and
two sides of the planar area in the second direction are provided with the bevel area, respectively, and the second direction is perpendicular to the first direction.

4. The apparatus according to claim 1, wherein
each of the at least two sand storage tanks comprises at least two sand storage bins, the at least two sand storage bins are arranged along the first direction, and a top surface of each of the at least two sand storage bins is provided with one material inlet; and
each of the at least two sand storage tanks further comprises at least one distributing valve, each of the at least one distributing valve is arranged between two material inlets, each of the at least one distributing valve is configured to receive sand from one of the at least two first conveying devices and convey the sand to one material inlet connected with the distributing valve.

5. The apparatus according to claim 4, wherein
the distributing valve comprises a shell and a baffle plate arranged inside the shell, the shell forms an inlet, a first outlet and a second outlet, a first passage is formed between the inlet and the first outlet, a second passage is formed between the inlet and the second outlet, and the baffle plate is configured to close one of the first passage and the second passage and open the other one of the first passage and the second passage;

a vertical distance from a top surface of the shell where the inlet of the shell is located to a bottom of the sand storage device is greater than a vertical distance from the top surface of the sand storage tank to the bottom of the sand storage device; and a side surface of the shell connecting the inlet and the first outlet is a bevel surface, and a side surface of the shell connecting the inlet and the second outlet is a bevel surface.

6. The apparatus according to claim 2, wherein
the supporting frame comprises an installing frame and a hanging frame connected to the installing frame, and the hanging frame is connected with the guide rail frame; and
a vertical distance from one end of the hanging frame away from the installing frame to a bottom of the supporting frame is greater than a vertical distance from one end of the hanging frame close to the installing frame to the bottom of the supporting frame.

7. The apparatus according to claim 1, further comprising:
a second conveying device, located at one side of the at least two sand storage tanks close to a bottom of the sand storage device, and configured to receive and convey the sand outputted by the at least two sand storage tanks; and
a third conveying device, connected with the second conveying device, and configured to receive the sand conveyed by the second conveying device and convey the sand to an target apparatus.

8. The apparatus according to claim 7, further comprising:
a rotation driving device, connected with the third conveying device, and configured to drive the third conveying device to rotate relative to the second conveying device.

9. The apparatus according to claim 8, wherein the sand storage device comprises:
a sluice valve, arranged at a material outlet of the sand storage device; and
a sluice valve driving device, configured to adjust an opening degree of the sluice valve so as to adjust a discharging speed of the sand storage device.

10. The apparatus according to claim 1, wherein each of the at least two sand storage tanks comprises a fixed tank body and an extension bin; and
the sand storage and conveying apparatus further comprises at least two extension bin driving devices, the at least two extension bin driving devices are configured to drive the extension bins of the at least two sand storage tanks to rise and fall, respectively, so as to adjust a capacity of the at least two sand storage tanks, respectively.

11. The apparatus according to claim 10, further comprising a processing device, wherein
each of the at least two extension bin driving devices comprises an extension bin lifting member, wherein the extension bin lifting member drives the extension bin to rise and fall, and each of the at least two extension bin driving devices is further configured to send a lifting height of the extension bin lifting member to the processing device; and
the processing device is configured to adjust extension bin lifting members of the at least two extension bin driving devices according to lifting heights of the lifting bin lifting members of the at least two extension bin driving devices.

12. The apparatus according to claim 11, wherein the processing device is configured to:
adjust the lifting height of the extension bin lifting member of at least one extension bin driving device when a difference between the lifting height of the extension bin lifting member of any one of the at least two extension bin driving devices and an average value of lifting heights of the extension bin lifting members of other extension bin driving devices is greater than a predetermined threshold value, so that the difference between the lifting height of the extension bin lifting member of any one of the at least two extension bin driving devices and the average value of the lifting heights of the extension bin lifting members of the other extension bin driving devices is less than or equal to the predetermined threshold value.

13. The apparatus according to claim 9, wherein
the second conveying device comprises a first conveyor belt, a first conveyor belt driving motor for driving the first conveyor belt to run and a first state detecting member for detecting a running state of the first conveyor belt;
the third conveying device comprises a second conveyor belt, a second conveyor belt driving motor for driving the second conveyor belt to run and a second state detecting member for detecting a running state of the second conveyor belt;
the sand storage and conveying apparatus further comprises a processing device, and the second state detecting member is further configured to send information about the running state of the second conveyor belt to the processing device; and
the processing device is further configured to control the first conveyor belt driving motor to stop running when the information about the running state of the second conveyor belt indicates that the second conveyor belt stops running.

14. The apparatus according to claim 13, wherein
the first state detecting member is further configured to send information about the running state of the first conveyor belt to the processing device; and
the processing device is further configured to control the sluice valve driving device to close the sluice valve when the information about the running state of the first conveyor belt indicates that the first conveyor belt stops running.

15. The apparatus according to claim 13, further comprising:
an opening degree detecting device, configured to detect an actual opening degree of the sluice valve and send the actual opening degree to the processing device;
a running speed detecting device, configured to detect an actual running speed of the first conveyor belt and send the actual running speed to the processing device; and
a weight detecting device, configured to detect an actual sand feeding quantity of the sand storage device and send the actual sand feeding quantity to the processing device.

16. The apparatus according to claim 15, wherein the processing device is further configured to:
send a first control signal to the sluice valve driving device according to a target sand feeding quantity and type information of the sand in the sand storage device so as to control the opening degree of the sluice valve;
determine a theoretical sand feeding quantity according to the actual opening degree of the sluice valve and the type information of the sand;
control the running speed of the first conveyor belt according to the theoretical sand feeding quantity; and
send a second control signal to the rotation driving device according to the actual running speed of the first conveyor belt and the theoretical sand feeding quantity so as to control an inclined angle of the third conveying device relative to the second conveying device.

17. The apparatus according to claim 16, wherein the processing device is further configured to:
control the running speed of the first conveyor belt in real time according to the actual sand feeding quantity and the actual running speed of the first conveyor belt.

* * * * *